United States Patent
Peavey et al.

(10) Patent No.: US 10,849,069 B2
(45) Date of Patent: Nov. 24, 2020

(54) APPARATUS, SYSTEM AND METHOD OF A BLUETOOTH UPPER MAC AND LOWER MAC ARCHITECTURE

(71) Applicant: INTEL CORPORATION, Santa Clara, CA (US)

(72) Inventors: David Lundgren Peavey, Fremont, CA (US); Sunil Kumar, Cupertino, CA (US); Sebastien Fievet, Cupertino, CA (US); Hakan Magnus Eriksson, Portland, OR (US); Oren Kaidar, Binyamina (IL); Jacques Behar, Zichron Yaacov (IL); Michael Shusterman, Rishon Lezion (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/232,097

(22) Filed: Dec. 26, 2018

(65) Prior Publication Data
US 2019/0132795 A1    May 2, 2019

(51) Int. Cl.
*H04W 52/02*    (2009.01)
*H04W 76/14*    (2018.01)
*H04W 4/80*    (2018.01)
*H04W 8/00*    (2009.01)

(52) U.S. Cl.
CPC ......... *H04W 52/0229* (2013.01); *H04W 4/80* (2018.02); *H04W 76/14* (2018.02); *H04W 8/005* (2013.01)

(58) Field of Classification Search
CPC ............................................... H04W 52/0229
USPC ........................................................ 370/311
See application file for complete search history.

(56) References Cited

U.S. PATENT DOCUMENTS

| | | | |
|---|---|---|---|
| 2002/0194500 A1* | 12/2002 | Bajikar | H04L 63/102 726/35 |
| 2007/0218938 A1* | 9/2007 | Carter | H04W 52/0251 455/528 |
| 2016/0100275 A1* | 4/2016 | Viswanadham | H04L 12/1886 455/41.2 |
| 2018/0255436 A1* | 9/2018 | Lou | H04W 4/80 |
| 2019/0216394 A1* | 7/2019 | Goldman | A61B 5/1036 |

OTHER PUBLICATIONS

Bluetooth Core Specification V 5.0, Dec. 6, 2016, 2822 pages.

* cited by examiner

*Primary Examiner* — Peter G Solinsky
(74) *Attorney, Agent, or Firm* — Shichrur & Co.

(57) ABSTRACT

For example, a Bluetooth (BT) apparatus may include a System on Chip (SoC), the SoC including an interface to a BT Lower Medium Access Control (MAC) (L-MAC) external to the SoC; and a BT Upper MAC (U-MAC) to generate setup information to configure one or more BT activities by the BT L-MAC, and to send the setup information to the BT L-MAC via the interface, the setup information to configure one or more wakeup criteria for the BT L-MAC to wake up the BT U-MAC, the one or more BT activities including at least a BT scan, wherein the BT U-MAC is configured to enter a power save mode and to wake up from the power save mode based on receipt of a wakeup indication from the BT L-MAC via the interface to the BT L-MAC.

25 Claims, 10 Drawing Sheets

APPARATUS, SYSTEM AND METHOD OF A BLUETOOTH UPPER MAC AND LOWER MAC ARCHITECTURE

TECHNICAL FIELD

Embodiments described herein generally relate to a Bluetooth Upper Medium Access Controller (MAC) and Lower MAC architecture.

BACKGROUND

In one or more use cases, a Bluetooth (BT) device may be required to perform one or more background operations for long periods of time.

These use cases may lead to strict power consumption requirements from the BT device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
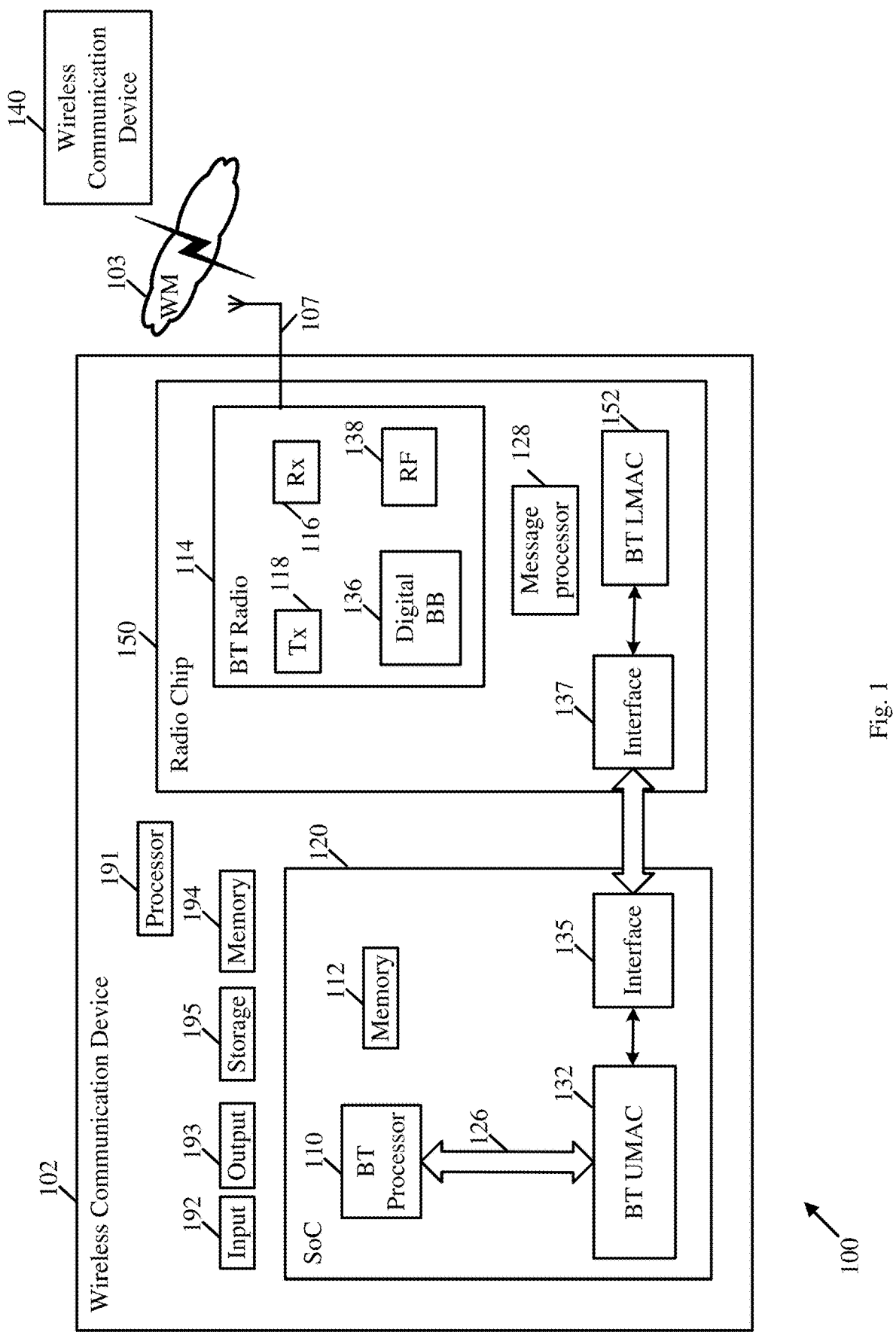
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Bluetooth device, a Bluetooth Low Energy (BLE) device, a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth standards"), e.g., including Bluetooth Core Specification V 5.0, Dec. 6, 2016, and/or future versions and/or derivatives thereof, devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, a Bluetooth system, a BLE system, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multistandard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

Some demonstrative embodiments are described herein with respect to BT communication, e.g., according to a BT protocol or a BLE protocol. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a BT channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102 and 140 may include or perform one or more functionalities of BT devices.

In some demonstrative embodiments, devices 102 and/or 140 may include one or more BT radios including circuitry and/or logic to perform wireless communication between devices 102, 140 and/or one or more other BT devices. For example, device 102 may include at least one BT radio 114.

In some demonstrative embodiments, device 102 may include one or more other radios, e.g., a WiFi radio, an OFDM radio, a cellular radio, and/or the like.

In some demonstrative embodiments, BT radio 114 may include a BT digital Baseband (BB) 136 and/or a BT RF circuitry 138, e.g., as described below.

In some demonstrative embodiments, BT radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, BT radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, BT radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, BT radio 114 may be configured to communicate over a 2.4 GHz band and/or any other band.

In some demonstrative embodiments, BT radio 114 may include, or may be associated with, one or more antennas 107, respectively.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, wireless communication devices 102 and/or 140 may form, or may communicate as part of, a BT network.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, in some use cases, implementations and/or scenarios, device 102 may be configured to perform one or more BT activities, for example, background activities and/or any other activities, over long periods of times, e.g., "all day high duty cycle background activities".

In some demonstrative embodiments, these use cases may require to comply with stringent power consumption Key Performance Indicator (KPI) requirements, e.g., from major mobile phone and/or laptop customers, for example, to reduce a power consumption of device 102.

In one example, a mobile customer may require the mobile device to perform all day, e.g., at 30% duty cycle, Low energy (LE) scans, for example, to look for nearby peripherals, e.g., such as smart watches, fitness trackers and the like. According to this example, one or more parameters of the duty cycle for the LE scans, may be defined, for example, Window=30 milliseconds (ms) an Interval=100 ms, and/or any other window and/or interval.

In another example, mobile computers, e.g., laptops, with an operating system (OS) may be required to perform LE scans all day, e.g., at 15% duty cycle. For example, the LE scans may be used as part of one or more pairing techniques, which may improve pairing time, e.g., of the mobile computers, to peripheral devices.

In some demonstrative embodiments, device 102 may be configured to support a low power Bluetooth architecture, to support at least some of the power KPI requirements and/or any other requirements, e.g., as described below.

In some demonstrative embodiments, in some use cases, implementations and/or scenarios, it may not be efficient and/or effective to use a first architecture (also referred to as "discrete design"), in which BT functionality may be implemented by a BT chip having a Host Controller Interface (HCI) with a System on Chip (SoC), e.g., as described below.

In one example, the discrete design may be implemented, for example, for automotive and/or mobile applications and/or other uses.

In some demonstrative embodiments, in some use cases, implementations and/or scenarios, it may not be efficient and/or effective to use a second architecture (also referred to as "integrated design"), in which a BT core may be divided into two parts, e.g., distributed between an SoC and a companion chip, e.g., as described below.

In one example, the integrated design may be implemented, for example, for PC devices and/or any other uses.

Figure 2:
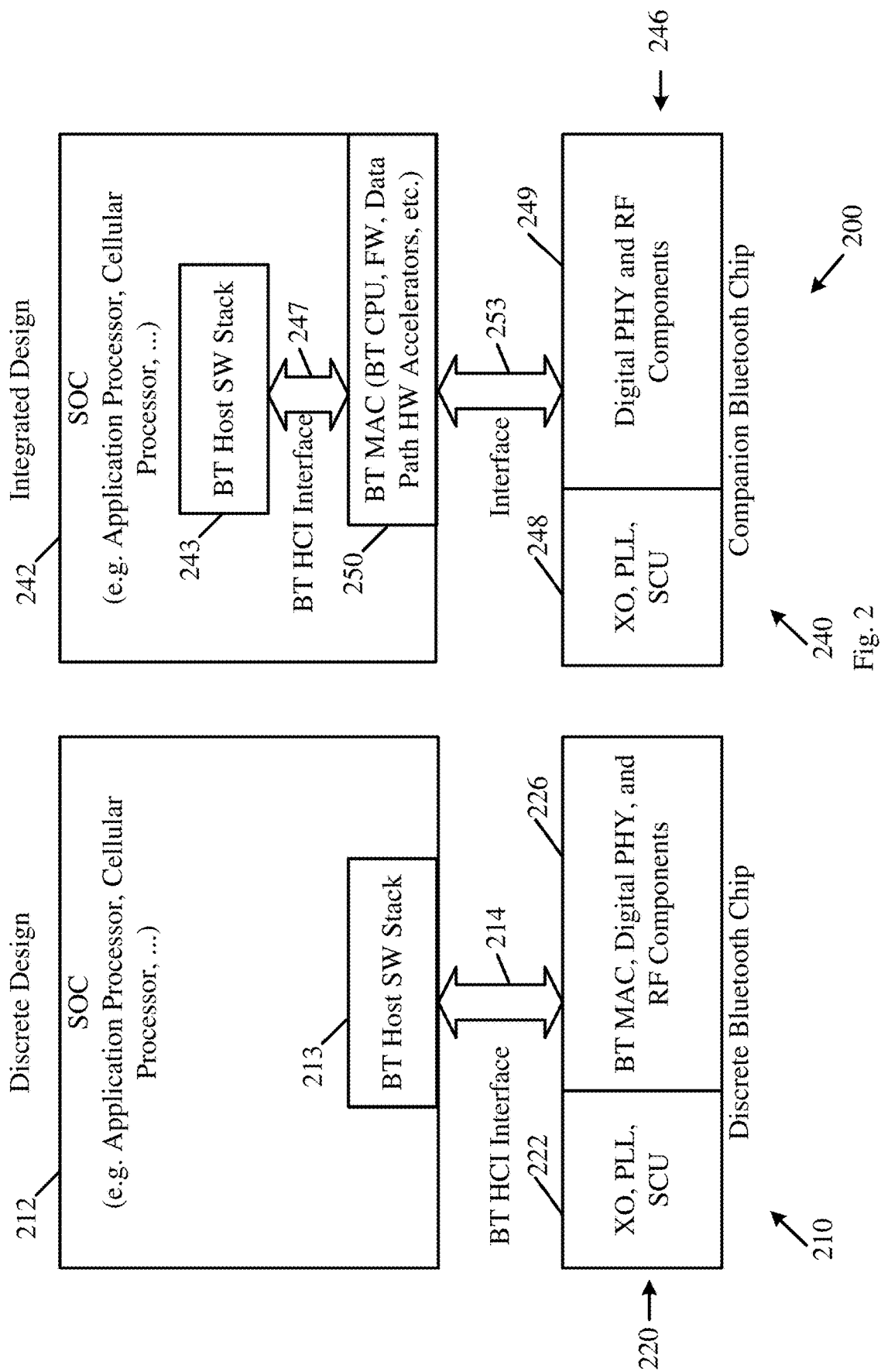
FIG. 2 is a schematic illustration of a discrete design and an integrated design, which may be implemented in accordance with some demonstrative embodiments.

Reference is made to FIG. 2, which schematically illustrates a discrete design 210 and an integrated design 240, which may be implemented in accordance with some demonstrative embodiments.

As shown in FIG. 2, discrete design 210 may include an SoC 212 having an HCI 214 with a BT chip 220.

As shown in FIG. 2, SoC 212 may include one or more processors, including, for example, an application processor, a cellular processor, and/or any other processor.

As shown in FIG. 2, SoC 212 may include a BT host 213, e.g., a BT host Software (SW) stack.

As shown in FIG. 2, BT chip 220 may include a first part 222, including, for example, a Phase Lock Loop (PLL) a Crystal Oscillator (XO), a System Control Unit (SCU), and/or any other additional and/or alternative components.

As shown in FIG. 2, BT chip 220 may include a second part 226, including, for example, digital components and/or analog components, e.g., as described below.

For example, the digital components in second part 226 may include, for example, a BT MAC and/or a BT PHY, and/or any other additional and/or alternative digital components.

For example, the analog components in second part 226 may include, for example, one or more analog and/or RF components, and/or any other additional and/or alternative digital components.

As shown in FIG. 2, integrated design 240 may include an SoC 242 and a companion chip 246, e.g., as described below.

As shown in FIG. 2, SoC 242 may include a BT host 243, e.g., a BT host SW stack, and/or one or more processors, including, for example, an application processor, a cellular processor, and/or any other processor.

As shown in FIG. 2, one or more BT components may be split between SoC 242 and companion chip 246, for example, compared to discrete design 210, in which all BT components are included in BT chip 220.

As shown in FIG. 2, SoC 242 may include a BT MAC 250 including, for example, a BT CPU, data path HW accelerators, e.g. encryption engines, a BT FW, a BT Host Transport, and/or any other additional and/or alternative MAC BT components.

As shown in FIG. 2, companion chip 246 may include a control part 248, including, for example, a PLL, an XO, an SCU, and/or any other additional and/or alternative components.

As shown in FIG. 2, companion chip 246 may include a BT part 249, including, for example, a digital PHY and one or more analog and/or RF components. For example, BT part 250 may not include the BT MAC, which may be in SoC 242, for example, compared to discrete design 210, in which the BT MAC is in BT chip 220.

As shown in FIG. 2, a BT HCI 247 may interface between BT host 243 and the BT MAC 250.

As shown in FIG. 2, an interface 253 may interface between SoC 242 and companion chip 246.

As shown in FIG. 2, discrete design 210 may include a complete Bluetooth Chip, e.g., BT chip 220, including the MAC, the PHY, and the one or more RF components, with HCI interface 214 to the SoC 212.

As shown in FIG. 2, according to integrated design 240, a Bluetooth core may be divided into first and second parts, e.g., as described below.

For example, a first part, e.g., BT MAC 250, which includes the BT CPU, the data path HW accelerators, the BT FW, and the BT Host Transport, may be integrated in an SoC, e.g., a PC Client SoC.

For example, a second part, e.g., BT part 249, which includes the Digital PHY and RF components, may be on a separate companion chip, e.g., companion chip 246.

As shown in FIG. 2, communication between Host SW 243 and BT MAC 250, which may be within SoC 242 may be performed using BT HCI interface 247, which may be defined by a Bluetooth Specification.

As shown in FIG. 2, communication between BT MAC 250, which is part of SoC 242 and the Digital PHY/RF, which is part of companion chip 246, may be performed using interface 253, e.g., using a proprietary protocol, for example, a high speed serial HW interface or any other interface.

In some demonstrative embodiments, in some use cases, implementations and/or scenarios, it may not be efficient and/or effective to use discrete design 210, e.g., as descried below.

In one example, discrete design 210 may have a high cost of manufacturing, for example, due to a larger die size. For example, the digital and analog RF components may be located on the same die, e.g., BT chip 220. For example, migration to a new process technology may be constrained by the analog RF components, thereby constraining reduction in a size of the digital components. Accordingly, discrete design 210 may have a large size, may be costly, and/or non-competitive.

In some demonstrative embodiments, in some use cases, implementations and/or scenarios, it may not be efficient and/or effective to use integrated design 240, e.g., as descried below.

In one example, in some use cases, implementations and/or scenarios, for example, in "all day high duty cycle background activities" scenario, one or more power KPIs of integrated design 240 may not be efficient or competitive. For example, the BT MAC 250 may be at an on-state in these use cases and, therefore, SoC resources, e.g., Crystal Oscillator (XTAL), Power rails, and the like, of SoC 242 may be required to be at the ON-state, for example, to keep BT MAC 250 at the ON-state. A power consumption of the SoC resources in these use cases may be increased, and may not meet the power KPI requirements.

For example, according to the discrete design 210, during background activities, the SOC 212 may be allowed to remain in a power save state, e.g., a deep sleep, while the components of BT chip 220, e.g., all components of BT chip 220, may be powered for the background activities.

For example, according to the integrated design 200, during background activities, the components of chip 246, the components of BT MAC 250, and components of SoC 242, e.g., an XO, a PLL, Bus Interfaces, and the like, may be powered on for the background activities.

Figure 3:
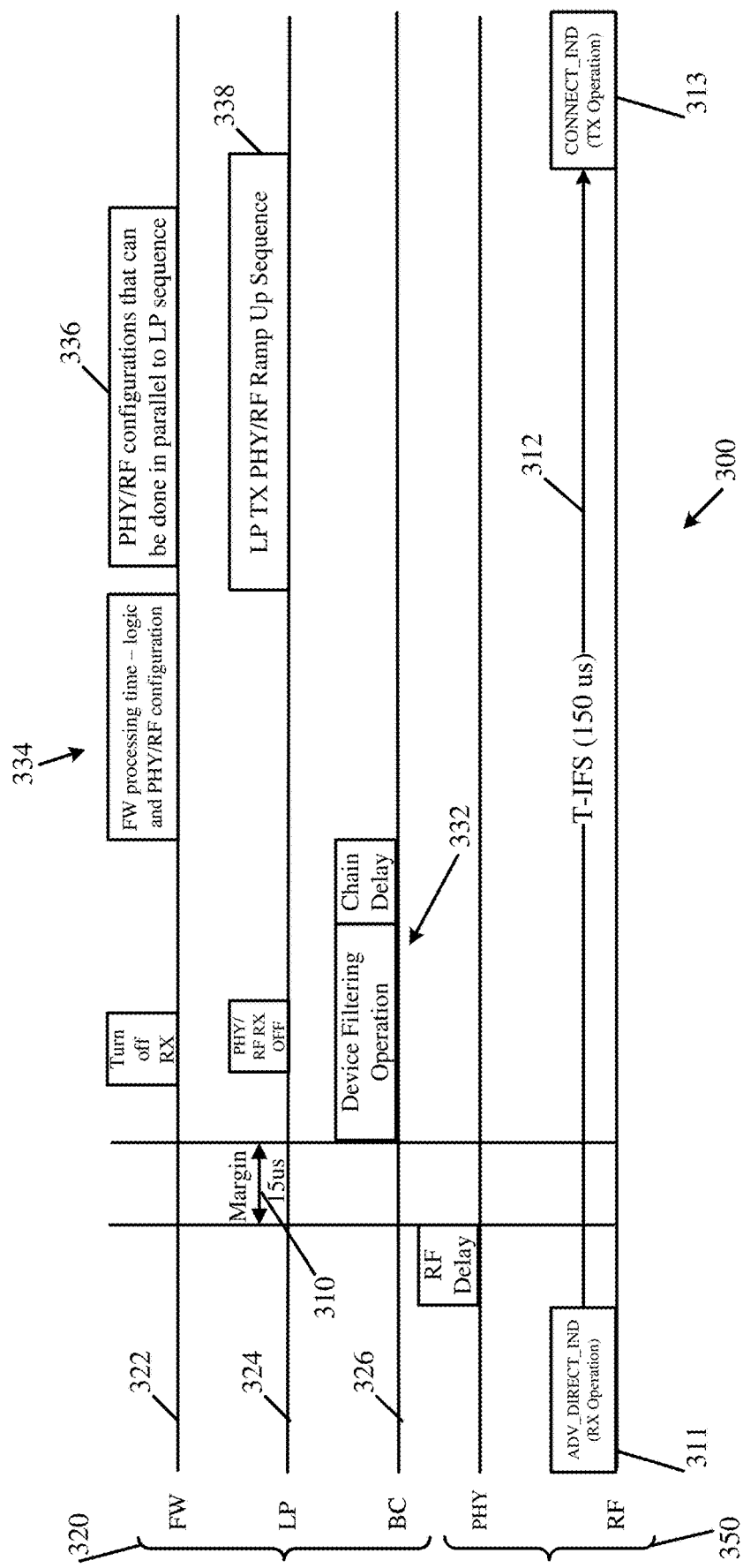
FIG. 3 is a schematic illustration of a Bluetooth (BT) scan, which may be implemented in accordance with some demonstrative embodiments.

Reference is made to FIG. 3, which schematically illustrates operations of a BT scan, which may be implemented in accordance with some demonstrative embodiments.

In one example, the operations of FIG. 3 may include one or more background activities, for example, a low energy (LE) scan operation, for example, when a BT device is listening for a potential advertiser in the neighborhood of the device.

As shown in FIG. 3, an LE protocol may enforce a time interval 312, e.g., a Time Interval Frame Space (T_IFS), e.g., of 150 microseconds (us), between a first packet 311 and a second consecutive packet 313, e.g., on a same channel.

For example, a Bluetooth Basic Rate/Enhanced Data Rate (BR/EDR) protocol may support time slots for communication. A slot duration of a time slot may be 625 us, and a TX or an RX may use 1, 3, or 5 time slots. Accordingly, a worst-case time duration between an end of a TX within a time slot and a start of an RX on a next time slot, or vice-versa, may be 189 us.

In one example, one or more scan operations may be performed in time interval 312, e.g., the T_IFS, for example, for LE Scans.

As shown in FIG. 3, the one or more scan operations may be performed by a Firmware (FW) 322, and/or a Hardware (HW), e.g., a Burst Composer (BC) 326 and/or a List Processor (LP) 324. In other components any other additional or alternative components may be used.

As shown in FIG. 3, the one or more scan operations may include a filtering operation 332, for example, to determine if a received packet is from a desired sender.

As shown in FIG. 3, filtering operation 332 may be performed by the HW, e.g., by BC 326, for example, using a white-list search and identity resolution accelerator.

The one or more scan operations may include integrity checks on the received packet, e.g., a Header, a CRC result, and the like.

As shown in FIG. 3, the integrity checks may include processing operations 334, for example, to prepare a response packet to be sent to a sender of the packet.

As shown in FIG. 3, processing operations 334 may be performed by the FW 322.

As shown in FIG. 3, the scan operations may include PHY/RF configurations 336, for example, to configure PHY/RF for a TX operation.

As shown in FIG. 3, PHY/RF configurations 336 may be performed by the FW 322.

As shown in FIG. 3, the scan operations may include a ramp-up operation 338, e.g., a PHY/RF Ramp Up Sequence.

As shown in FIG. 3, ramp-up operation 338 may be performed by the HW, e.g., by LP 324, for example, by a PHY/RF timing controller.

In some demonstrative embodiments, in some use cases, scenarios and/or implementations, it may not be advantageous to implement an architecture in which one or more of operations 320 are implemented by components of an SoC, e.g., SoC 242 (FIG. 2), and one or more operations 350 are implemented by a companion chip, e.g., companion chip 246 (FIG. 2).

For example, a timing margin 310 for LE Scan operation may be restricted, for example, to a duration of about 10% of the time interval 312, e.g., of about 15 us. Accordingly, the duration requirement on timing margin 310 may not enable to switch the SoC to a power save mode for a long duration, e.g., during an active part of the LE Scan operation. Accordingly, keeping the SoC, e.g., SoC 242 (FIG. 2), operating in an active mode may result in a power penalty, which may cause not to meet power KPIs for background activities. A power penalty of keeping larger SoC in active mode may reduce a probability of meeting the power consumption KPIs for the background activities.

Referring back to FIG. 1, in some demonstrative embodiments, device 102 may be configured to implement and/or support a BT architecture, which may be cost effective and/or efficient, and/or power effective and/or efficient, e.g., as described below.

In some demonstrative embodiments, the BT architecture may support a partition of a BT core between an SoC and a chip, e.g., a companion chip, and/or offloading background activities from the SoC to the companion chip, e.g., in a way which may improve the cost efficiency and/or the power efficiency, e.g., as described below.

In some demonstrative embodiments, the BT architecture may allow the SoC to remain in a sleep state, e.g., a deep sleep state, for example, while background activities may be performed by the companion chip, in a way which may increase power efficiency of the background activities, e.g., as described below.

In some demonstrative embodiments, the BT architecture may allow the SoC, a BT CPU, e.g., a large BT CPU, and/or an interface, e.g., a High Speed Serial Interface, to not be involved and/or to be in a sleep state, for example, during the background activities, e.g., as described below.

In one example, the BT CPU may be used for user data handling, for example, audio compression and/or decompression, companion chip interface handling, non-real time Bluetooth protocol handling, and/or any other additional and/or alternative non-real time operation.

Figure 4:
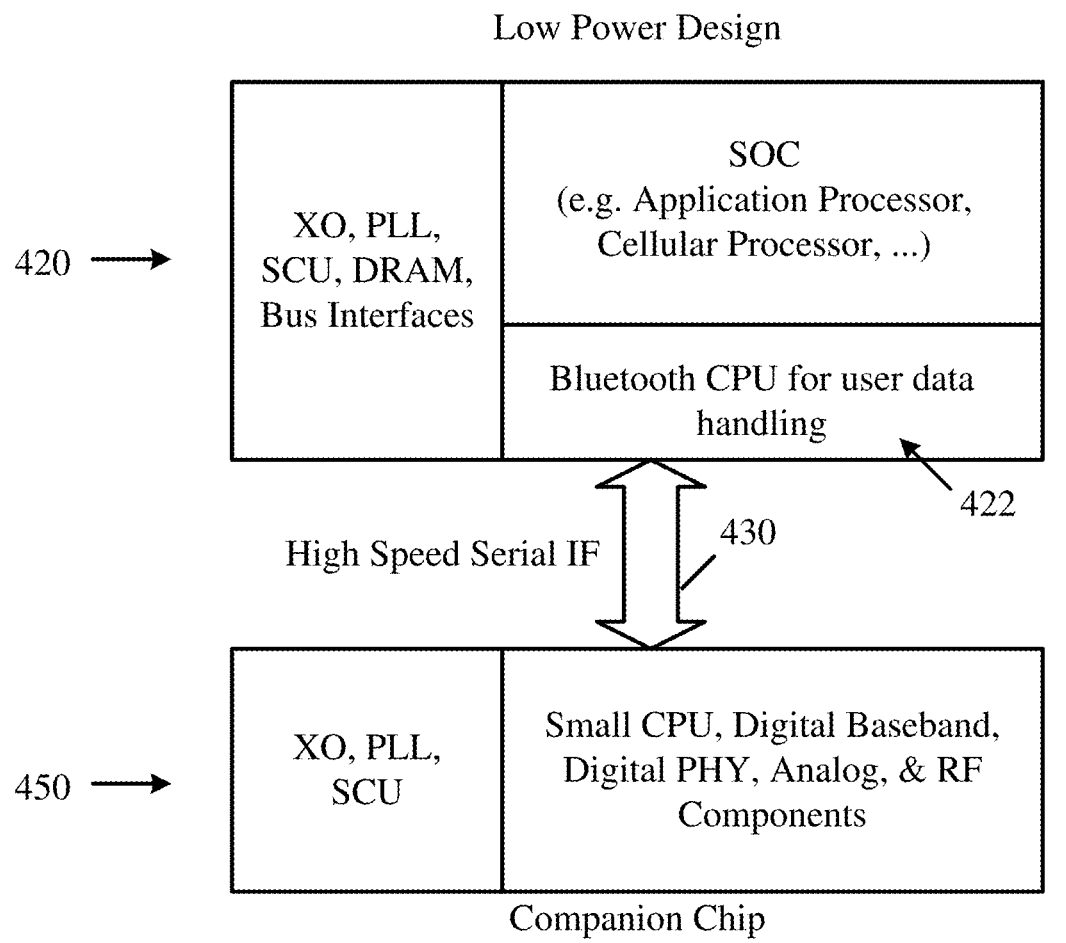
FIG. 4 is a schematic illustration of a BT architecture, in accordance with some demonstrative embodiments.

Reference is made to FIG. 4, which schematically illustrates a BT architecture 400, in accordance with some demonstrative embodiments.

In some demonstrative embodiments, as shown in FIG. 4, BT architecture 400 may include an SoC 420, a chip 450, e.g., a companion chip, and an interface 430, e.g., a High Speed Serial Interface, between SoC 420 and chip 450.

In some demonstrative embodiments, as shown in FIG. 4, SoC 420 may include a BT CPU 422, e.g., a large BT CPU, e.g., to be used for user data handling, for example, audio compression and/or decompression, companion chip interface handling, non-real time Bluetooth protocol handling, and/or any other additional and/or alternative operations.

In some demonstrative embodiments, as shown in FIG. 4, an interface, e.g., a High Speed Serial Interface, may not be involved and/or may be in a sleep state, for example, during the background activities, e.g., as described below.

In some demonstrative embodiments, as shown in FIG. 4, chip 450 may include, for example, a BT CPU, e.g., a small BT CPU, a digital BB, a digital PHY, one or more analog and/or RF components, and/or any other additional and/or alternative components.

In some demonstrative embodiments, chip 450 may be configured to perform the background activities, for example, while allowing SoC 420 to be in a sleep state.

In some demonstrative embodiments, one or more components, e.g., some or all components, of chip 450 may be in a wake-state during the background activities, while one or more components, e.g., some or all components, of SoC 420 may be allowed to be in a sleep-state during the background activities.

Referring back to FIG. 1, in some demonstrative embodiments, device 102 may be configured to implement and/or support one or more, e.g., some or all, operations and/or components of BT architecture 400 (FIG. 4), and/or additional or alternative functionalities, e.g., as described below.

In some demonstrative embodiments, device 102 may include an SoC 120 and a radio chip 150, e.g., as described below.

In some demonstrative embodiments, SoC 120 may include a BT Upper MAC (U-MAC) 132, which may be separate from the radio chip 150, e.g., as described below.

In some demonstrative embodiments, radio chip 150 may include a BT Lower MAC (L-MAC) 152, which may be external to SoC 120, e.g., as described below.

In some demonstrative embodiments, radio chip 150 may include BT radio 114, e.g., as described below.

In some demonstrative embodiments, SoC 120 may include an interface 135 to BT L-MAC 152, which may be external to the SoC 120, e.g., as described below.

In some demonstrative embodiments, radio chip 150 may include an interface 137 to the BT U-MAC 132, which may be separate from the radio chip 120, e.g., as described below.

In some demonstrative embodiments, interfaces 135 and/or 137 may include a high-speed serial interface, e.g., as described below. In other embodiments, any other interface may be implemented.

In some demonstrative embodiments, BT U-MAC 132 may be configured to perform, and/or to trigger, cause, instruct and/or control one or more components of SoC 120 to perform, one or more communications, to generate and/or communicate one or more messages and/or transmissions, and/or to perform one or more functionalities, operations and/or procedures between SoC 120 and radio chip 150, and/or one or more other devices; and/or BT L-MAC 152 may be configured to perform, and/or to trigger, cause, instruct and/or control radio chip 150 to perform, one or more communications, to generate and/or communicate one or more messages and/or transmissions, and/or to perform one or more functionalities, operations and/or procedures between SoC 120 and radio chip 150, and/or one or more other devices, e.g., as described below.

In some demonstrative embodiments, BT U-MAC 132 may include, or may be implemented, partially or entirely, by circuitry and/or logic, e.g., one or more processors including circuitry and/or logic, memory circuitry and/or logic, Media-Access Control (MAC) circuitry and/or logic, Application Processor (AP) circuitry and/or logic, an AP processor, an AP memory, and/or any other circuitry and/or logic, configured to perform the functionality of BT U-MAC 132, respectively. Additionally or alternatively, one or more functionalities of controllers BT U-MAC 132 may be implemented by logic, which may be executed by a machine and/or one or more processors, e.g., as described below.

In some demonstrative embodiments, BT L-MAC 152 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, and/or any other circuitry and/or logic, configured to perform the functionality of BT L-MAC 152, respectively. Additionally or alternatively, one or more functionalities of controllers BT L-MAC 152 may be implemented by logic, which may be executed by a machine and/or one or more processors, e.g., as described below.

In some demonstrative embodiments, radio chip 150 may include a message processor 128 configured to generate, process and/or access one or more messages communicated by radio chip 150. The message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, SoC 120 may include a host SoC, e.g., as described below. In other embodiments, SoC 120 may include any other SoC, e.g., as described below.

In some demonstrative embodiments, SoC 120 may include a BT host processor 110, and/or a host memory 112, e.g., as described below.

In some demonstrative embodiments, SoC 120 may include a BT Host Controller Interface (HCI) 126 to interface between the BT U-MAC 132 and the BT host processor 110, e.g., as described below.

In some demonstrative embodiments, BT U-MAC 132 may be configured to generate setup information to configure one or more BT activities by the BT L-MAC 152, and to send the setup information to the BT L-MAC 152, for example, via the interface 135, e.g., as described below.

In some demonstrative embodiments, the setup information may configure one or more wakeup criteria for the BT L-MAC 152, for example, to wake up the BT U-MAC 132, e.g., as described below.

In some demonstrative embodiments, the one or more BT activities may include at least a BT scan, e.g., as described below.

In some demonstrative embodiments, BT U-MAC 132 may be configured to enter a power save mode, and/or to wake up from the power save mode, for example, based on receipt of a wakeup indication from the BT L-MAC 152, for example, via the interface 135 to the BT L-MAC 152, e.g., as described below.

In some demonstrative embodiments, interface 137 may be configured to receive from the BT U-MAC 132 the setup information to setup the one or more BT activities and to configure the one or more wakeup criteria for the BT L-MAC 152 to wake up the BT U-MAC 132, e.g., as described below.

In some demonstrative embodiments, BT L-MAC 152 may be configured to perform the one or more BT activities, for example, based on the setup information from the BT U-MAC 132, e.g., as described below.

In some demonstrative embodiments, the BT L-MAC 152 may be configured to cause the interface 137 to send the wakeup indication to the BT U-MAC 132, for example, based on the wakeup criteria, e.g., as described below.

In some demonstrative embodiments, the BT L-MAC 152 may be configured to cause the interface 137 to send the wakeup indication to the BT U-MAC, for example, based on an outcome of at least one of the BT activities, e.g., as described below.

In some demonstrative embodiments, the BT L-MAC 152 may be configured to cause the interface 137 to send the wakeup indication to the BT U-MAC 132, for example, based on a result of the BT scan, e.g., as described below.

In some demonstrative embodiments, BT U-MAC 132 may be configured to process one or more BT user data handling activities, e.g., as described below.

In some demonstrative embodiments, BT U-MAC 132 may be configured to be at the power save mode, for example, during at least part of one or more BT activity periods of the one or more BT activities, e.g., as described below.

In some demonstrative embodiments, BT U-MAC 132 may be configured to be at the power save mode, for example, during at least part of a scan period of the BT scan, e.g., as described below.

In some demonstrative embodiments, the BT U-MAC 132 may be configured to perform one or more non-real-time BT activities.

In some demonstrative embodiments, the BT L-MAC 152 may be configured to perform the BT activities, for example, autonomously from the BT U-MAC.

In some demonstrative embodiments, the BT L-MAC 152 may be configured to control operation of the BT radio 114, for example, according to the BT activities.

In some demonstrative embodiments, the one or more BT activities may include one or more background activities, e.g., as described below.

In some demonstrative embodiments, the one or more BT activities may include one or more real-time activities, e.g., as described below.

In some demonstrative embodiments, the one or more BT activities may include, for example, a device discovery activity, an advertisement activity, and/or an idle connection activity.

In some demonstrative embodiments, the one or more BT activities may include, for example, a BT LE Scan activity, an LE advertising activity, communication of an LE scan request, and/or communication of an LE scan response.

In some demonstrative embodiments, the one or more BT activities may include, for example, a BT paging activity, a BT inquiry activity, and/or a BT synchronization activity, and/or any other activity.

In some demonstrative embodiments, the one or more BT activities may include any other additional and/or alternative operations, communications and/or activities.

In some demonstrative embodiments, the setup information may include, for example, message processing setup information, e.g., to configure processing of one or more BT messages received by the BT L-MAC 152, e.g., as described below.

In some demonstrative embodiments, the setup information may include message processing setup information to configure processing of the one or more wireless BT messages received by the BT radio 114.

In some demonstrative embodiments, the BT L-MAC 152 may be configured to process a BT message received by the BT radio 114, for example, based on the message processing setup information, e.g., even autonomously from the BT U-MAC 132.

In some demonstrative embodiments, the BT L-MAC 152 may be configured to process a BT message received by the BT radio 114, for example, based on the message processing setup information, e.g., even without waking up the BT U-MAC 132.

In some demonstrative embodiments, the message processing setup information may be configured to define, for example, one or more criteria for the BT L-MAC 152 to transmit a response to a wireless BT message received by the BT L-MAC 152 from BT radio 114, e.g., as described below.

In some demonstrative embodiments, the message processing setup information may be configured to define, for example, one or more criteria for the BT L-MAC 152 to transmit a response to a BT advertisement and/or a BT scan request.

In some demonstrative embodiments, the message processing setup information may include one or more filtering parameters for the BT scan, e.g., as described below.

In some demonstrative embodiments, BT L-MAC 152 may be configured to provide to BT U-MAC 132, and/or the BT U-MAC 132 may be configured to receive from the BT L-MAC 152, scan results, for example, based on the filtering parameters.

In some demonstrative embodiments, the one or more wakeup criteria may include, for example, a time-based wakeup criterion, e.g., to define a time at which the BT L-MAC 152 may be configured to send the wakeup indication to the BT U-MAC 132.

In some demonstrative embodiments, the one or more wakeup criteria may include an activity-based wakeup criterion to define, for example, that the BT L-MAC 152 is to be configured to send the wakeup indication to the BT U-MAC 132, for example, based on an outcome of at least one of the BT activities.

In some demonstrative embodiments, the setup information may be configured to define one or more BT message parameters, e.g., as described below.

In some demonstrative embodiments, the one or more wakeup criteria may include a communication-based wakeup criterion to define that the BT L-MAC 152 is to send the wakeup indication to the BT U-MAC, for example, based on receipt of one or more BT messages corresponding to the one or more BT message parameters, e.g., as described below.

In some demonstrative embodiments, the one or more BT message parameters may include a BT message type parameter and/or a BT message content parameter.

In one example, the BT message type parameter may include, for example, a parameter corresponding to a type of the BT message, for example, a request, a response, an advertisement ("advertise"), or any other type.

In one example, the BT message content parameter may include a parameter corresponding to content, e.g., partial or entire content, of the BT message, for example, a hashed content or any other content.

In other embodiments, the one or more BT message parameters may include any other additional or alternative parameter.

In some demonstrative embodiments, BT L-MAC 152 may be configured to send the wakeup indication to the BT U-MAC 132, for example, based on receipt at the BT radio 114, of the one or more BT messages corresponding to the one or more BT message parameters.

Figure 5:
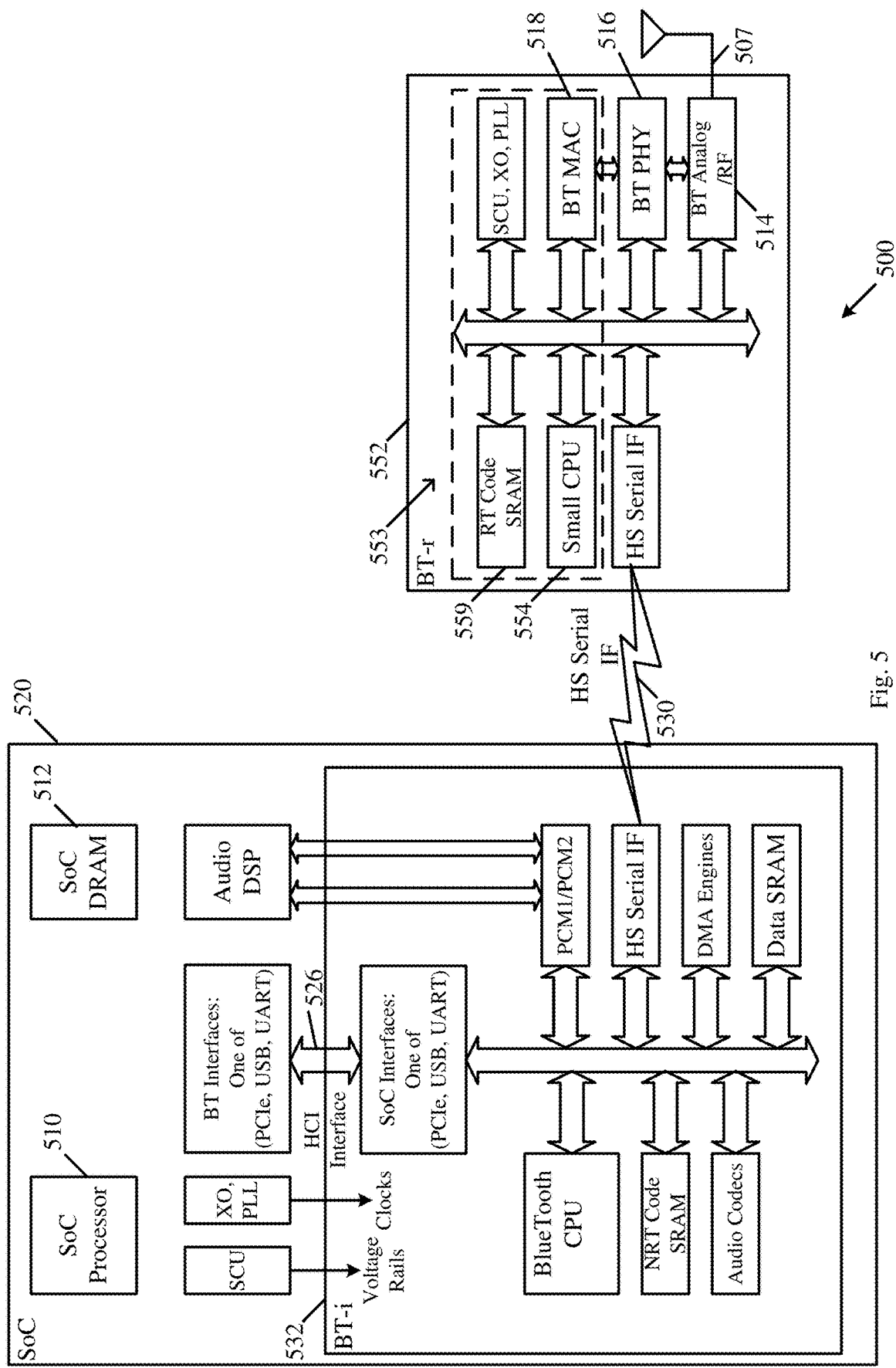
FIG. 5 is a schematic illustration of a BT architecture, in accordance with some demonstrative embodiments.

Reference is made to FIG. 5, which schematically illustrates a BT architecture 500, in accordance with some demonstrative embodiments.

In some demonstrative embodiments, as shown in FIG. 5, BT architecture 500 may include an SoC 520 including a BT U-MAC 532 ("BT-i").

In one example, SoC 120 (FIG. 1) may perform one or more operations of, one or more functionalities of, the functionality of, and/or the role of SoC 520, and/or BT U-MAC 132 (FIG. 1) may perform one or more operations of, one or more functionalities of, the functionality of, and/or the role of BT U-MAC 532.

In some demonstrative embodiments, as shown in FIG. 5, BT architecture 500 may include an interface 530, e.g., a High Speed Serial Interface and/or any other interface, between U-MAC 532 and a BT L-MAC 553 in a companion chip 552 ("BT-r"), e.g., as described below.

In some demonstrative embodiments, the BT L-MAC 553 may be implemented, for example, by a BT MAC 518, at least one CPU, e.g., a small CPU 554, one or more memory and/or storage components, e.g., a Real Time (RT) code SRAM 559, and/or one or more other components of companion chip 552.

In one example, BT L-MAC 152 (FIG. 1) may perform one or more operations of, one or more functionalities of, the functionality of, and/or the role of the BT L-MAC 553 in chip 552, e.g., including BT MAC 518, small CPU 554, and/or the RT code SRAM 559; and/or interfaces 135 and/or 137 (FIG. 1) may perform one or more operations of, one or more functionalities of, the functionality of, and/or the role of interface 530.

In some demonstrative embodiments, BT U-MAC 532 may be configured to perform and/or handle non-real time flow operations, for example, transport layer operations, audio/voice Codecs operations, RF calibrations, and/or any other additional or alternative operations.

In some demonstrative embodiments, BT U-MAC 532 may include one or more CPU components, e.g., a relatively powerful CPU complex.

In some demonstrative embodiments, as shown in FIG. 5, BT U-MAC 532 may be integrated within SoC 520.

In some demonstrative embodiments, BT MAC 518 may be configured to perform one or more BT activities, for example, real time flow operations, for example, traffic and packet scheduling, and/or any other additional or alternative operations.

In some demonstrative embodiments, as shown in FIG. 5, chip 552 may also a digital PHY 516, analog and RF components 514, and/or any other additional or alternative components.

In some demonstrative embodiments, chip 552 may be integrated as part of a separate companion chip, e.g., radio chip 150 (FIG. 1), or any other chip separate from SoC 520.

In some demonstrative embodiments, as shown in FIG. 5, interface 530, e.g., the High Speed Serial Interface, may interface between U-MAC 532 and the BT L-MAC 553 in chip 552.

In some demonstrative embodiments, the BT L-MAC 553 in chip 552 may include circuitry and/or logic to perform one or more BT activities, for example, background activities, for example, autonomously from BT U-MAC 532, for example, based on an initial setup from BT U-MAC 532.

In some demonstrative embodiments, BT U-MAC 532 may configure BT activities, e.g., LE Scan, Connection and the like, of BT MAC 518, and/or may send activity parameters to BT MAC 518 to handle the configure BT activities, e.g., autonomously.

In some demonstrative embodiments, BT U-MAC 532 may enter a power save mode, e.g., a deep sleep state, while the BT L-MAC 553 in chip 552 may perform the background activities, e.g., autonomously from BT U-MAC 532. For example, BT MAC 518 and/or CPU 554 may switch power states, e.g., of radio chip 150 (FIG. 1), for example, even without involvement of BT U-MAC 532.

In some demonstrative embodiments, the BT L-MAC 553 in chip 552 may wake up BT U-MAC 532, for example, when required, e.g., when a received advertising packet is accepted, e.g., by a filter policy.

In some demonstrative embodiments, BT MAC 518 may be configured to switch between wakeup states and power save states during idle times, e.g., between scheduled RF activities, for example, during autonomous operation of BT L-MAC 553.

In some demonstrative embodiments, BT MAC 518 and/or CPU 554 may be configured to perform some or all real time BT activities, including, for example, programming RF components 514 and/or PHY 516, and/or protocol timing requirements.

In some demonstrative embodiments, BT U-MAC 532 may be configured to perform some or all non-real time BT activities, including, for example, host transport handling, audio/voice compression and/or decompression and/or the like.

In some demonstrative embodiments, BT architecture 500 may improve a power consumption for background activities, for example, while preserving a low cost and/or a reduced die size provided by an integrated design, e.g., integrated design 240 (FIG. 2).

Figure 6:
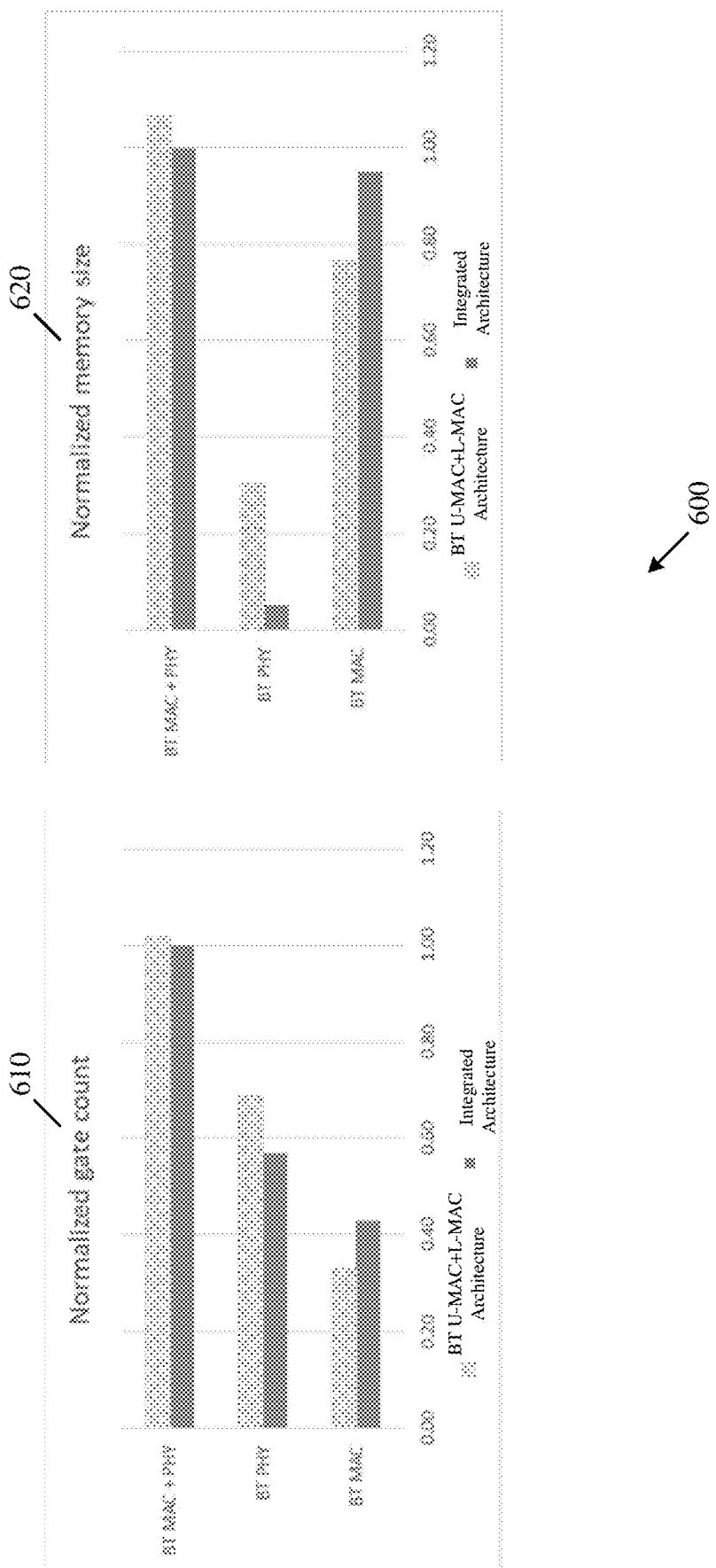
FIG. 6 is a schematic illustration of a normalized gate count graph and a normalized memory size graph corresponding to two BT architectures, in accordance with some demonstrative embodiments.

Reference is made to FIG. 6, which schematically illustrates a normalized gate count graph 610 and a normalized memory size graph 620 of two BT architectures.

In some demonstrative embodiments, as shown in FIG. 6, normalized gate count graph 610 depicts a normalized gate count of BT architecture 500 (FIG. 5) versus normalized gate count of integrated design 240 (FIG. 2).

In some demonstrative embodiments, as Shown in FIG. 6, normalized memory size graph 620 depicts a normalized memory size of BT architecture 500 (FIG. 5) versus a normalized memory size of integrated design 240 (FIG. 2).

Figure 7:
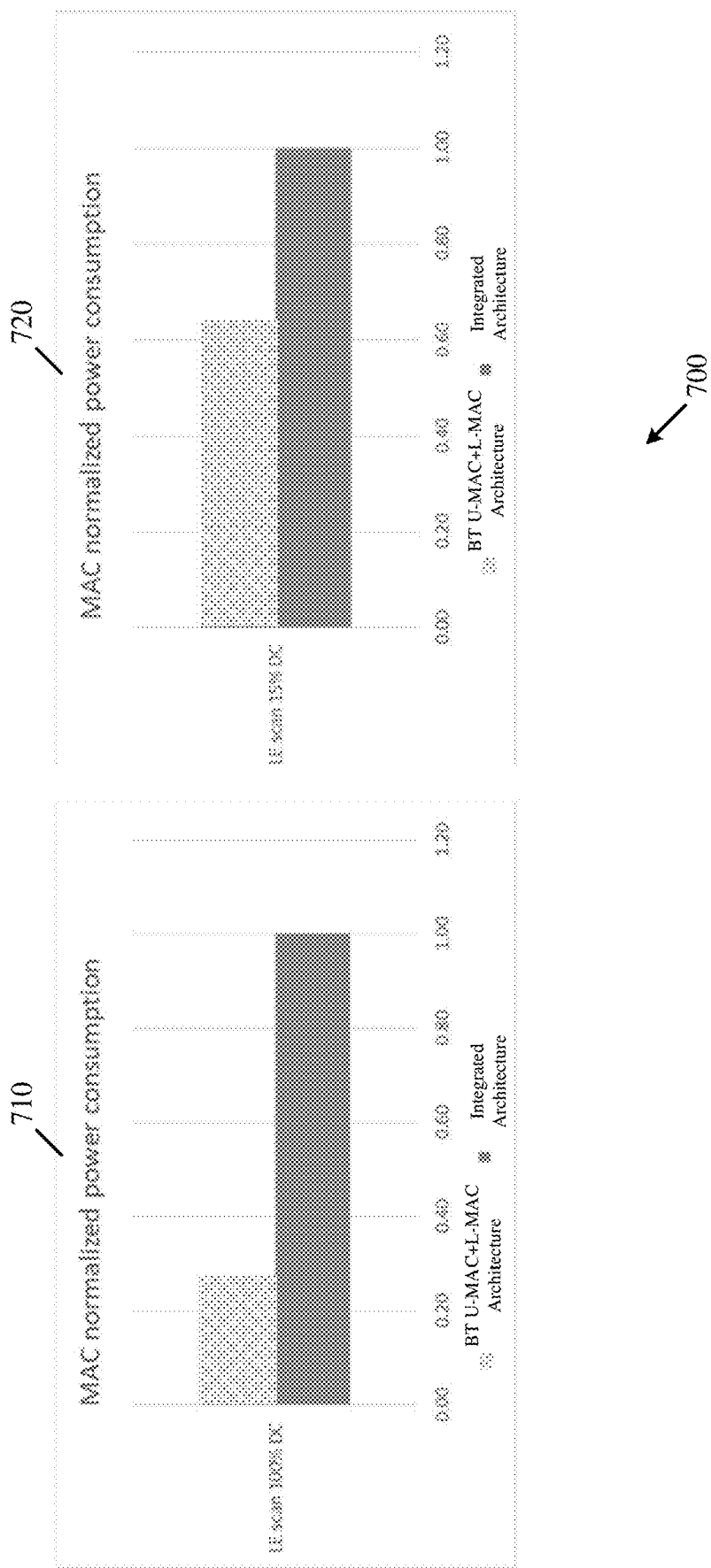
FIG. 7 is a schematic illustration of a first power consumption graph and a second power consumption graph corresponding to two BT architectures, in accordance with some demonstrative embodiments.

Reference is made to FIG. 7, which schematically illustrates a first power consumption graph 710 and a second power consumption graph 720 corresponding to two BT architectures.

In some demonstrative embodiments, first power consumption graph 710 depicts a power consumption of BT architecture 500 (FIG. 5) versus a power consumption of integrated design 240 (FIG. 2), for example, during an LE scan at a 100% duty cycle.

In some demonstrative embodiments, second power consumption graph 710 depicts a power consumption of BT architecture 500 (FIG. 5) versus a power consumption of integrated design 240 (FIG. 2), for example, during an LE scan at a 15% duty cycle.

As shown in FIGS. 6 and 7, in some demonstrative embodiments, by moving a split point and/or taking a minor increase on an overall area of a die, e.g., gates and/or memory, BT architecture 500 (FIG. 5) may significantly improve power consumption of BT architecture 500 (FIG. 5), and/or may provide an advantage to an LE Scan use case.

In some demonstrative embodiments, the following Measurement use case and parameters may be defined:

Use case: LE scan

Scan Window: 30 ms

Scan Interval: 100 ms

In some demonstrative embodiments, a resulting system states duration may be determined, e.g., as follows:

Active time: 30 ms (Scan window)

Transition time

Deep sleep time=Scan Interval−(Active time+transition time).

In some demonstrative embodiments, the following definitions may be used:

BT U-MAC, e.g., BT U-MAC 532 (FIG. 5), may be part of larger SoC, and may handle non real time BT activities.

BT L-MAC, e.g., BT L-MAC 553 (FIG. 5), may be part of the discrete companion RF chip, and may handle real time BT activities.

In one example, the power KPI improvements made in an Active Scan Primitive may be advantageous to an overall LE Scan use case. The power KPI improvements may become more significant, for example, when using a higher duty cycle, for example, greater than 15%, for example, a mobile customer using a 30% duty cycle.

In some demonstrative embodiments, BT architecture implementing the BT U-MAC/L-MAC architecture may be applied to discrete design 210 (FIG. 2). For example, BT L-MAC 553 (FIG. 5) may be autonomous in handling background activities, while BT U-MAC 532 (FIG. 5) may be allowed to be in a power save mode, e.g., a deep sleep state. This may allow saving power consumption due to gated clock an/or power sources and/or routing, e.g., PLLs, clock trees, LDOs and dedicated power rails for BT U-MAC 532 (FIG. 5).

Figure 8:
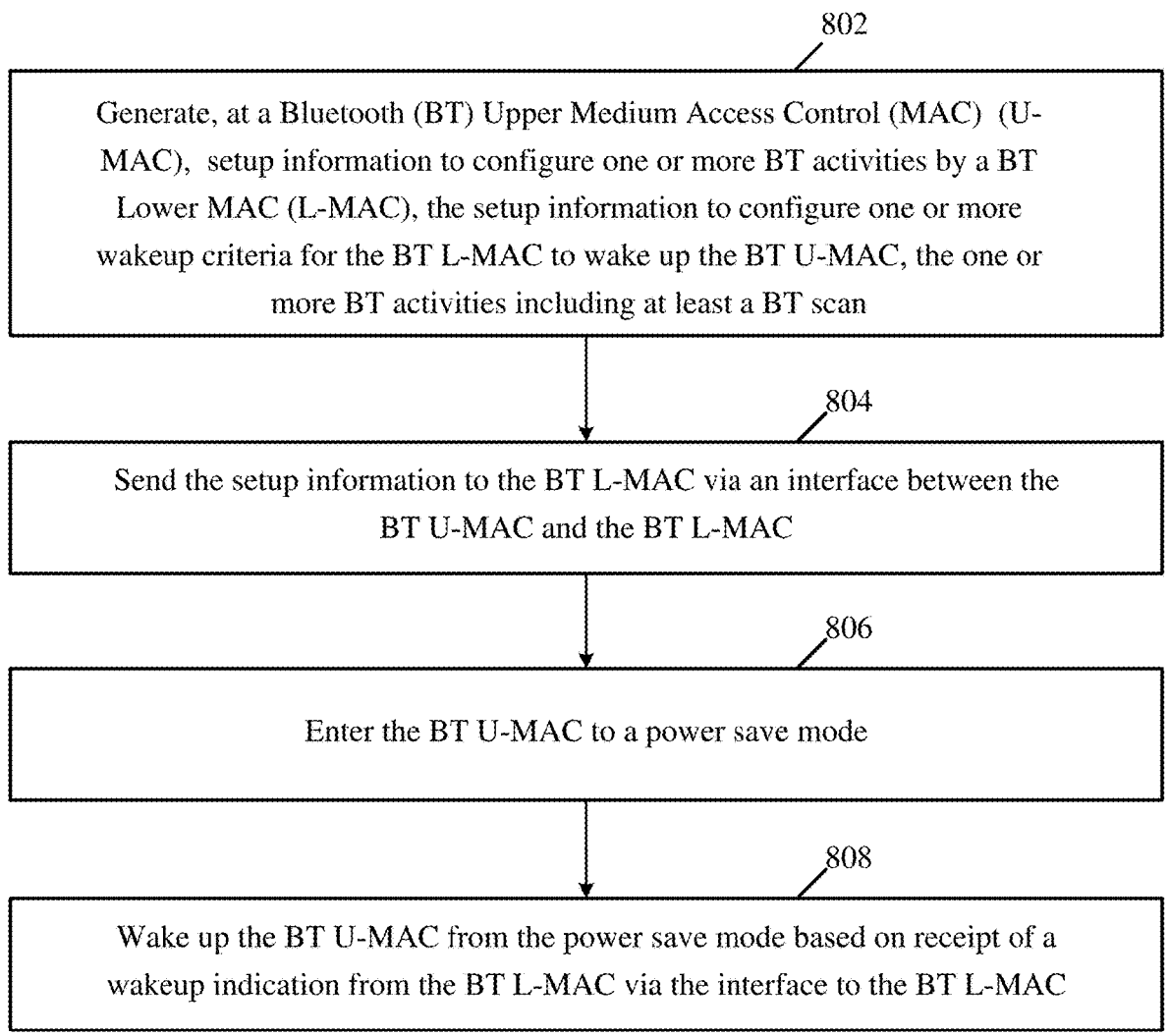
FIG. 8 is a schematic flow-chart illustration of a method of processing BT communication, in accordance with some demonstrative embodiments.

Reference is made to FIG. 8, which schematically illustrates a method of BT processing, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1), an SoC, e.g., SoC 120 (FIG. 1), a BT U-MAC, e.g., BT U-MAC 132 (FIG. 1), a BT L-MAC, e.g., BT L-MAC 152 (FIG. 1), a radio chip, e.g., radio chip 150 (FIG. 1), an interface, e.g., interfaces 135 and/or 137 (FIG. 1), a BT radio, e.g., radio 114 (FIG. 1), a receiver, e.g., receiver 116 (FIG. 1) and/or a message processor, e.g., message processor 128 (FIG. 1).

As indicated at block 802, the method may include generating at a BT U-MAC setup information to configure one or more BT activities by a BT L-MAC, the setup information to configure one or more wakeup criteria for the BT L-MAC to wake up the BT U-MAC, the one or more BT activities including at least a BT scan. For example, BT U-MAC 132 (FIG. 1) may generate the setup information to configure the one or more BT activities by the BT L-MAC 152 (FIG. 1), the setup information to configure the one or more wakeup criteria for the BT L-MAC 152 (FIG. 1) to wake up the BT U-MAC 132 (FIG. 1), e.g., as described above.

As indicated at block 804, the method may include sending the setup information to the BT L-MAC via an interface between the BT U-MAC and the BT L-MAC. For example, BT U-MAC 132 (FIG. 1) may send the setup information to the BT L-MAC 152 (FIG. 1) via interfaces 135 and 137 (FIG. 1) between the BT U-MAC 132 (FIG. 1) and the BT L-MAC 152 (FIG. 1), e.g., as described above.

As indicated at block 806, the method may include entering the BT U-MAC to a power save mode. For example, BT U-MAC 132 (FIG. 1) may enter the power save mode, e.g., as described above.

As indicated at block 808, the method may include waking up the BT U-MAC from the power save mode based on receipt of a wakeup indication from the BT L-MAC via the interface to the BT L-MAC. For example, BT U-MAC 132 (FIG. 1) may wake up from the power save mode based on receipt of the wakeup indication from the BT L-MAC 152 (FIG. 1) via the interface 135 (FIG. 1), e.g., as described above.

Figure 9:
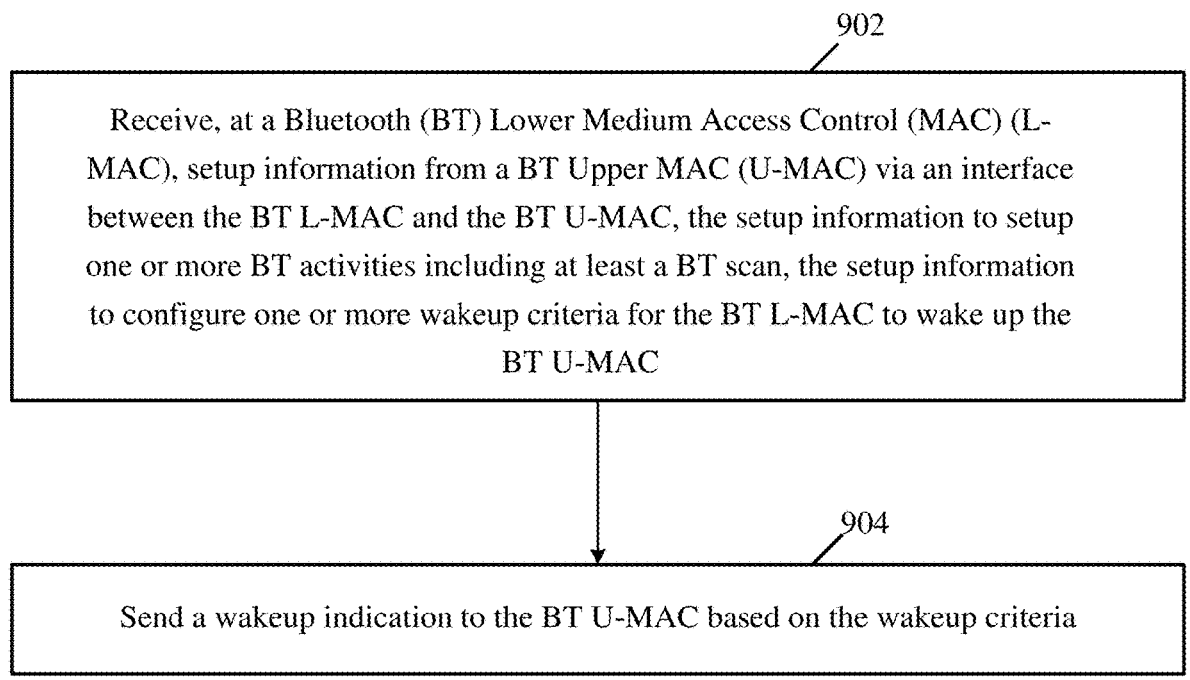
FIG. 9 is a schematic flow-chart illustration of a method of processing BT communication, in accordance with some demonstrative embodiments.

Reference is made to FIG. 9, which schematically illustrates a method of a BT, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1), an SoC, e.g., SoC 120 (FIG. 1), a BT U-MAC, e.g., BT U-MAC 132 (FIG. 1), a BT L-MAC, e.g., BT L-MAC 152 (FIG. 1), a radio chip, e.g., radio chip 150 (FIG. 1), an interface, e.g., interfaces 135 and/or 137 (FIG. 1), a BT radio, e.g., radio 114 (FIG. 1), a receiver, e.g., receiver 116 (FIG. 1) and/or a message processor, e.g., message processor 128 (FIG. 1).

As indicated at block 902, the method may include receiving at a BT L-MAC setup information from a BT U-MAC via an interface between the BT L-MAC and the BT U-MAC, the setup information to setup one or more BT activities including at least a BT scan, the setup information to configure one or more wakeup criteria for the BT L-MAC to wake up the BT U-MAC. For example, BT L-MAC 152 (FIG. 1) may receive the setup information from BT U-MAC 132 (FIG. 1) via interface 137 (FIG. 1), the setup information to setup the one or more BT activities including at least the BT scan, the setup information to configure the one or more wakeup criteria for the BT L-MAC 152 (FIG. 1) to wake up the BT U-MAC 132 (FIG. 1), e.g., as described above.

As indicated at block 904, the method may include sending a wakeup indication to the BT U-MAC based on the wakeup criteria. For example, BT L-MAC 152 (FIG. 1) may send the wakeup indication to the BT U-MAC 132 (FIG. 1), for example, based on the wakeup criteria, e.g., as described above.

Figure 10:
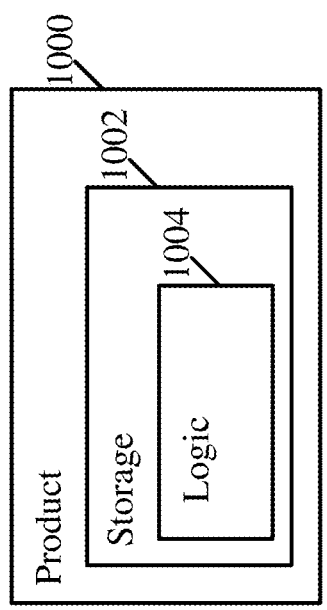
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), SoC 120 (FIG. 1), BT U-MAC 132 (FIG. 1), BT L-MAC 152 (FIG. 1), radio chip 150 (FIG. 1), interfaces 135 and/or 137 (FIG. 1), BT radio 114 (FIG. 1), receiver 116 (FIG. 1) and/or message processor 128 (FIG. 1), to cause device 102 (FIG. 1), device 140 (FIG. 1), SoC 120 (FIG. 1), BT U-MAC 132 (FIG. 1), BT L-MAC 152 (FIG. 1), radio chip 150 (FIG. 1), interfaces 135 and/or 137 (FIG. 1), BT radio 114 (FIG. 1), receiver 116 (FIG. 1) and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, and/or 9, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1000 and/or machine-readable storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Bluetooth (BT) apparatus comprising a System on Chip (SoC), the SoC comprising an interface to a BT Lower Medium Access Control (MAC) (L-MAC) external to the SoC; and a BT Upper MAC (U-MAC) to generate setup information to configure one or more BT activities by the BT L-MAC, and to send the setup information to the BT L-MAC via the interface, the setup information to configure one or more wakeup criteria for the BT L-MAC to wake up the BT U-MAC, the one or more BT activities comprising at least a BT scan, wherein the BT U-MAC is configured to enter a power save mode and to wake up from the power save mode based on receipt of a wakeup indication from the BT L-MAC via the interface to the BT L-MAC.

Example 2 includes the subject matter of Example 1, and optionally, wherein the setup information comprises message processing setup information to configure processing of one or more BT messages received by the BT L-MAC.

Example 3 includes the subject matter of Example 2, and optionally, wherein the message processing setup information is to define one or more criteria for the BT L-MAC to transmit a response to a wireless BT message received by the BT L-MAC.

Example 4 includes the subject matter of Example 2 or 3, and optionally, wherein the message processing setup information is to define one or more criteria for the BT L-MAC to transmit a response to a BT advertisement or a BT scan request.

Example 5 includes the subject matter of any one of Examples 2-4, and optionally, wherein the message processing setup information comprises one or more filtering parameters for the BT scan, the BT U-MAC to receive from the BT L-MAC scan results based on the filtering parameters.

Example 6 includes the subject matter of any one of Examples 1-5, and optionally, wherein the one or more wakeup criteria comprise a time-based wakeup criterion to define a time at which the BT L-MAC is to send the wakeup indication to the BT U-MAC.

Example 7 includes the subject matter of any one of Examples 1-6, and optionally, wherein the setup information is to define one or more BT message parameters, and the one or more wakeup criteria comprise a communication-based wakeup criterion to define that the BT L-MAC is to send the wakeup indication to the BT U-MAC based on receipt of one or more BT messages corresponding to the one or more BT message parameters.

Example 8 includes the subject matter of Example 7, and optionally, wherein the one or more BT message parameters comprise at least one of a BT message type parameter or a BT message content parameter.

Example 9 includes the subject matter of any one of Examples 1-8, and optionally, wherein the one or more wakeup criteria comprise an activity-based wakeup criterion to define that the BT L-MAC is to send the wakeup indication to the BT U-MAC based on an outcome of at least one of the BT activities.

Example 10 includes the subject matter of any one of Examples 1-9, and optionally, wherein the BT U-MAC is configured to be at the power save mode during at least part of a scan period of the BT scan.

Example 11 includes the subject matter of any one of Examples 1-10, and optionally, wherein the BT U-MAC is configured to be at the power save mode during at least part of one or more BT activity periods of the one or more BT activities.

Example 12 includes the subject matter of any one of Examples 1-11, and optionally, wherein the BT U-MAC is configured to process one or more BT user data handling activities.

Example 13 includes the subject matter of any one of Examples 1-12, and optionally, wherein the one or more BT activities comprise at least one of a device discovery activity, an advertisement activity, or an idle connection activity.

Example 14 includes the subject matter of any one of Examples 1-13, and optionally, wherein the one or more BT activities comprise at least one of a BT Low Energy (LE) Scan activity, an LE advertising activity, communication of an LE scan request, or communication of an LE scan response.

Example 15 includes the subject matter of any one of Examples 1-14, and optionally, wherein the one or more BT activities comprise at least one of a BT paging activity, a BT inquiry activity, or a BT synchronization activity.

Example 16 includes the subject matter of any one of Examples 1-15, and optionally, wherein the one or more BT activities comprise one or more background activities.

Example 17 includes the subject matter of any one of Examples 1-16, and optionally, wherein the one or more BT activities comprise one or more real-time activities, the BT U-MAC configured to perform one or more non-real-time BT activities.

Example 18 includes the subject matter of any one of Examples 1-17, and optionally, comprising a BT Host Controller Interface (HCI) to interface between the BT U-MAC and a BT host processor.

Example 19 includes the subject matter of any one of Examples 1-18, and optionally, wherein the interface to the BT L-MAC comprises a high-speed serial interface.

Example 20 includes the subject matter of any one of Examples 1-19, and optionally, wherein the SoC comprises a host SoC, the host SoC comprising a BT host processor, and a host memory.

Example 21 includes the subject matter of any one of Examples 1-20, and optionally, comprising a radio chip, the radio chip comprising a BT radio and the BT L-MAC to perform the one or more BT activities based on the setup information from the BT U-MAC.

Example 22 includes the subject matter of one of Examples 1-21, and optionally, comprising one or more antennas.

Example 23 includes a method to be performed at a Bluetooth (BT) apparatus, the method comprising generating, at a BT Upper Medium Access Control (MAC) (U-MAC), setup information to configure one or more BT activities by a BT Lower MAC (L-MAC), the one or more BT activities comprising at least a BT scan, the setup information to configure one or more wakeup criteria for the BT L-MAC to wake up the BT U-MAC; sending the setup information to the BT L-MAC via an interface between the BT U-MAC and the BT L-MAC; allowing the BT U-MAC to enter a power save mode; and waking up the BT U-MAC from the power save mode based on receipt of a wakeup indication from the BT L-MAC via the interface to the BT L-MAC.

Example 24 includes the subject matter of Example 23, and optionally, wherein the setup information comprises message processing setup information to configure processing of one or more BT messages received by the BT L-MAC.

Example 25 includes the subject matter of Example 24, and optionally, wherein the message processing setup information is to define one or more criteria for the BT L-MAC to transmit a response to a wireless BT message received by the BT L-MAC.

Example 26 includes the subject matter of Example 24 or 25, and optionally, wherein the message processing setup information is to define one or more criteria for the BT L-MAC to transmit a response to a BT advertisement or a BT scan request.

Example 27 includes the subject matter of any one of Examples 24-26, and optionally, wherein the message processing setup information comprises one or more filtering parameters for the BT scan, the method comprising receiving at the BT U-MAC scan results based on the filtering parameters from the BT L-MAC.

Example 28 includes the subject matter of any one of Examples 23-27, and optionally, wherein the one or more wakeup criteria comprise a time-based wakeup criterion to define a time at which the BT L-MAC is to send the wakeup indication to the BT U-MAC.

Example 29 includes the subject matter of any one of Examples 23-28, and optionally, wherein the setup information is to define one or more BT message parameters, and the one or more wakeup criteria comprise a communication-based wakeup criterion to define that the BT L-MAC is to send the wakeup indication to the BT U-MAC based on receipt of one or more BT messages corresponding to the one or more BT message parameters.

Example 30 includes the subject matter of Example 29, and optionally, wherein the one or more BT message parameters comprise at least one of a BT message type parameter or a BT message content parameter.

Example 31 includes the subject matter of any one of Examples 23-30, and optionally, wherein the one or more wakeup criteria comprise an activity-based wakeup criterion to define that the BT L-MAC is to send the wakeup indication to the BT U-MAC based on an outcome of at least one of the BT activities.

Example 32 includes the subject matter of any one of Examples 23-31, and optionally, comprising configuring the BT U-MAC to be at the power save mode during at least part of a scan period of the BT scan.

Example 33 includes the subject matter of any one of Examples 23-32, and optionally, comprising configuring the BT U-MAC to be at the power save mode during at least part of one or more BT activity periods of the one or more BT activities.

Example 34 includes the subject matter of any one of Examples 23-33, and optionally, comprising configuring the BT U-MAC to process one or more BT user data handling activities.

Example 35 includes the subject matter of any one of Examples 23-34, and optionally, wherein the one or more BT activities comprise at least one of a device discovery activity, an advertisement activity, or an idle connection activity.

Example 36 includes the subject matter of any one of Examples 23-35, and optionally, wherein the one or more BT activities comprise at least one of a BT Low Energy (LE) Scan activity, an LE advertising activity, communication of an LE scan request, or communication of an LE scan response.

Example 37 includes the subject matter of any one of Examples 23-36, and optionally, wherein the one or more BT activities comprise at least one of a BT paging activity, a BT inquiry activity, or a BT synchronization activity.

Example 38 includes the subject matter of any one of Examples 23-37, and optionally, wherein the one or more BT activities comprise one or more background activities.

Example 39 includes the subject matter of any one of Examples 23-38, and optionally, wherein the one or more BT activities comprise one or more real-time activities, the method comprising configuring the BT U-MAC to perform one or more non-real-time BT activities.

Example 40 includes a product comprising one or more tangible computer-readable non-transitory storage media comprising computer-executable instructions operable to, when executed by at least one processor, enable the at least one processor to cause a Bluetooth (BT) apparatus to generate, at a BT Upper Medium Access Control (MAC) (U-MAC), setup information to configure one or more BT activities by a BT Lower MAC (L-MAC), the one or more BT activities comprising at least a BT scan, the setup information to configure one or more wakeup criteria for the BT L-MAC to wake up the BT U-MAC; send the setup information to the BT L-MAC via an interface between the BT U-MAC and the BT L-MAC; allow the BT U-MAC to enter a power save mode; and wake up the BT U-MAC from the power save mode based on receipt of a wakeup indication from the BT L-MAC via the interface to the BT L-MAC.

Example 41 includes the subject matter of Example 40, and optionally, wherein the setup information comprises message processing setup information to configure processing of one or more BT messages received by the BT L-MAC.

Example 42 includes the subject matter of Example 41, and optionally, wherein the message processing setup information is to define one or more criteria for the BT L-MAC to transmit a response to a wireless BT message received by the BT L-MAC.

Example 43 includes the subject matter of Example 41 or 42, and optionally, wherein the message processing setup information is to define one or more criteria for the BT L-MAC to transmit a response to a BT advertisement or a BT scan request.

Example 44 includes the subject matter of any one of Examples 41-43, and optionally, wherein the message processing setup information comprises one or more filtering parameters for the BT scan, the instructions, when executed, cause the BT U-MAC to receive from the BT L-MAC scan results based on the filtering parameters.

Example 45 includes the subject matter of any one of Examples 40-44, and optionally, wherein the one or more wakeup criteria comprise a time-based wakeup criterion to define a time at which the BT L-MAC is to send the wakeup indication to the BT U-MAC.

Example 46 includes the subject matter of any one of Examples 40-45, and optionally, wherein the setup information is to define one or more BT message parameters, and the one or more wakeup criteria comprise a communication-based wakeup criterion to define that the BT L-MAC is to send the wakeup indication to the BT U-MAC based on receipt of one or more BT messages corresponding to the one or more BT message parameters.

Example 47 includes the subject matter of Example 46, and optionally, wherein the one or more BT message parameters comprise at least one of a BT message type parameter or a BT message content parameter.

Example 48 includes the subject matter of any one of Examples 40-47, and optionally, wherein the one or more wakeup criteria comprise an activity-based wakeup criterion to define that the BT L-MAC is to send the wakeup indication to the BT U-MAC based on an outcome of at least one of the BT activities.

Example 49 includes the subject matter of any one of Examples 40-48, and optionally, wherein the instructions, when executed, cause the BT U-MAC to be at the power save mode during at least part of a scan period of the BT scan.

Example 50 includes the subject matter of any one of Examples 40-49, and optionally, wherein the instructions, when executed, cause the BT U-MAC to be at the power save mode during at least part of one or more BT activity periods of the one or more BT activities.

Example 51 includes the subject matter of any one of Examples 40-50, and optionally, wherein the instructions, when executed, cause the BT U-MAC to process one or more BT user data handling activities.

Example 52 includes the subject matter of any one of Examples 40-51, and optionally, wherein the one or more BT activities comprise at least one of a device discovery activity, an advertisement activity, or an idle connection activity.

Example 53 includes the subject matter of any one of Examples 40-52, and optionally, wherein the one or more BT activities comprise at least one of a BT Low Energy (LE) Scan activity, an LE advertising activity, communication of an LE scan request, or communication of an LE scan response.

Example 54 includes the subject matter of any one of Examples 40-53, and optionally, wherein the one or more BT activities comprise at least one of a BT paging activity, a BT inquiry activity, or a BT synchronization activity.

Example 55 includes the subject matter of any one of Examples 40-54, and optionally, wherein the one or more BT activities comprise one or more background activities.

Example 56 includes the subject matter of any one of Examples 40-55, and optionally, wherein the one or more BT activities comprise one or more real-time activities, the instructions, when executed, cause the BT U-MAC to perform one or more non-real-time BT activities.

Example 57 includes a Bluetooth (BT) apparatus comprising means for generating, at a BT Upper Medium Access Control (MAC) (U-MAC), setup information to configure one or more BT activities by a BT Lower MAC (L-MAC), the one or more BT activities comprising at least a BT scan, the setup information to configure one or more wakeup criteria for the BT L-MAC to wake up the BT U-MAC; means for sending the setup information to the BT L-MAC via an interface between the BT U-MAC and the BT L-MAC; means for allowing the BT U-MAC to enter a power save mode; and means for waking up the BT U-MAC from the power save mode based on receipt of a wakeup indication from the BT L-MAC via the interface to the BT L-MAC.

Example 58 includes the subject matter of Example 57, and optionally, wherein the setup information comprises message processing setup information to configure processing of one or more BT messages received by the BT L-MAC.

Example 59 includes the subject matter of Example 58, and optionally, wherein the message processing setup information is to define one or more criteria for the BT L-MAC to transmit a response to a wireless BT message received by the BT L-MAC.

Example 60 includes the subject matter of Example 58 or 59, and optionally, wherein the message processing setup information is to define one or more criteria for the BT L-MAC to transmit a response to a BT advertisement or a BT scan request.

Example 61 includes the subject matter of any one of Examples 58-60, and optionally, wherein the message processing setup information comprises one or more filtering parameters for the BT scan, the apparatus comprising means for receiving at the BT U-MAC scan results based on the filtering parameters from the BT L-MAC.

Example 62 includes the subject matter of any one of Examples 57-61, and optionally, wherein the one or more wakeup criteria comprise a time-based wakeup criterion to define a time at which the BT L-MAC is to send the wakeup indication to the BT U-MAC.

Example 63 includes the subject matter of any one of Examples 57-62, and optionally, wherein the setup information is to define one or more BT message parameters, and the one or more wakeup criteria comprise a communication-based wakeup criterion to define that the BT L-MAC is to send the wakeup indication to the BT U-MAC based on receipt of one or more BT messages corresponding to the one or more BT message parameters.

Example 64 includes the subject matter of Example 63, and optionally, wherein the one or more BT message parameters comprise at least one of a BT message type parameter or a BT message content parameter.

Example 65 includes the subject matter of any one of Examples 57-64, and optionally, wherein the one or more wakeup criteria comprise an activity-based wakeup criterion to define that the BT L-MAC is to send the wakeup indication to the BT U-MAC based on an outcome of at least one of the BT activities.

Example 66 includes the subject matter of any one of Examples 57-65, and optionally, comprising means for configuring the BT U-MAC to be at the power save mode during at least part of a scan period of the BT scan.

Example 67 includes the subject matter of any one of Examples 57-66, and optionally, comprising means for configuring the BT U-MAC to be at the power save mode during at least part of one or more BT activity periods of the one or more BT activities.

Example 68 includes the subject matter of any one of Examples 57-67, and optionally, comprising means for configuring the BT U-MAC to process one or more BT user data handling activities.

Example 69 includes the subject matter of any one of Examples 57-68, and optionally, wherein the one or more BT activities comprise at least one of a device discovery activity, an advertisement activity, or an idle connection activity.

Example 70 includes the subject matter of any one of Examples 57-69, and optionally, wherein the one or more BT activities comprise at least one of a BT Low Energy (LE) Scan activity, an LE advertising activity, communication of an LE scan request, or communication of an LE scan response.

Example 71 includes the subject matter of any one of Examples 57-70, and optionally, wherein the one or more BT activities comprise at least one of a BT paging activity, a BT inquiry activity, or a BT synchronization activity.

Example 72 includes the subject matter of any one of Examples 57-71, and optionally, wherein the one or more BT activities comprise one or more background activities.

Example 73 includes the subject matter of any one of Examples 57-72, and optionally, wherein the one or more BT activities comprise one or more real-time activities, the apparatus comprising means for configuring the BT U-MAC to perform one or more non-real-time BT activities.

Example 74 includes a Bluetooth (BT) apparatus comprising a radio chip, the radio chip comprising a BT radio to communicate BT signals; an interface to a BT Upper Medium Access Control (MAC) (U-MAC) separate from the radio chip, the interface configured to receive from the BT U-MAC setup information to setup one or more BT activities, the one or more BT activities comprising at least a BT scan, the setup information to configure one or more wakeup criteria for the BT L-MAC to wake up the BT U-MAC; and a BT Lower MAC (L-MAC) comprising logic and circuitry to perform the one or more BT activities based on the setup information from the BT U-MAC, the BT L-MAC configured to cause the interface to send a wakeup indication to the BT U-MAC based on the wakeup criteria.

Example 75 includes the subject matter of Example 74, and optionally, wherein the setup information comprises message processing setup information to configure processing of one or more wireless BT messages received by the BT radio.

Example 76 includes the subject matter of Example 75, and optionally, wherein the BT L-MAC is to process a BT message received by the BT radio based on the message processing setup information and autonomously from the BT U-MAC.

Example 77 includes the subject matter of Example 75 or 76, and optionally, wherein the BT L-MAC is to process a BT message received by the BT radio based on the message processing setup information and without waking up the BT U-MAC.

Example 78 includes the subject matter of any one of Examples 75-77, and optionally, wherein the message processing setup information is to define one or more criteria for the BT L-MAC to cause the BT radio to transmit a response to a BT message received by the BT radio.

Example 79 includes the subject matter of any one of Examples 75-78, and optionally, wherein the message processing setup information is to define one or more criteria for the BT L-MAC to cause the BT radio to transmit a response to a BT advertisement or a BT scan request.

Example 80 includes the subject matter of any one of Examples 75-79, and optionally, wherein the message processing setup information comprises one or more filtering parameters for the BT scan, the BT L-MAC to send to the BT U-MAC scan results based on the filtering parameters.

Example 81 includes the subject matter of any one of Examples 74-80, and optionally, wherein the one or more wakeup criteria comprise a time-based wakeup criterion to define a time at which the BT L-MAC is to send the wakeup indication to the BT U-MAC.

Example 82 includes the subject matter of any one of Examples 74-81, and optionally, wherein the setup information is to define one or more BT message parameters, the BT L-MAC configured to send the wakeup indication to the BT U-MAC based on receipt at the BT radio of one or more BT messages corresponding to the one or more BT message parameters.

Example 83 includes the subject matter of Example 82, and optionally, wherein the one or more BT message parameters comprise at least one of a BT message type parameter or a BT message content parameter.

Example 84 includes the subject matter of any one of Examples 74-83, and optionally, wherein the BT L-MAC is configured to send the wakeup indication to the BT U-MAC based on an outcome of at least one of the BT activities.

Example 85 includes the subject matter of any one of Examples 74-84, and optionally, wherein the BT L-MAC is configured to cause the interface to send the wakeup indication to the BT U-MAC based on a result of the BT scan.

Example 86 includes the subject matter of any one of Examples 74-85, and optionally, wherein the BT L-MAC is configured to control operation of the BT radio according to the BT activities.

Example 87 includes the subject matter of any one of Examples 74-86, and optionally, wherein the BT L-MAC is configured to perform the BT activities autonomously from the BT U-MAC.

Example 88 includes the subject matter of any one of Examples 74-87, and optionally, wherein the one or more BT activities comprise at least one of a device discovery activity, an advertisement activity, or an idle connection activity.

Example 89 includes the subject matter of any one of Examples 74-88, and optionally, wherein the one or more BT activities comprise at least one of a BT Low Energy (LE) Scan activity, an LE advertising activity, communication of an LE scan request, or communication of an LE scan response.

Example 90 includes the subject matter of any one of Examples 74-89, and optionally, wherein the one or more BT activities comprise at least one of a BT paging activity, a BT inquiry activity, or a BT synchronization activity.

Example 91 includes the subject matter of any one of Examples 74-90, and optionally, wherein the one or more BT activities comprise one or more background activities.

Example 92 includes the subject matter of any one of Examples 74-91, and optionally, wherein the one or more BT activities comprise one or more real-time activities.

Example 93 includes the subject matter of any one of Examples 74-92, and optionally, wherein the BT radio comprises a BT digital baseband (BB) and BT Radio Frequency (RF) circuitry.

Example 94 includes the subject matter of any one of Examples 74-93, and optionally, wherein the interface to the BT U-MAC comprises a high-speed serial interface.

Example 95 includes the subject matter of any one of Examples 74-94, and optionally, comprising a System on Chip (SoC), the SoC comprising the BT U-MAC to generate the setup information and to send the setup information to the BT L-MAC via the interface.

Example 96 includes the subject matter of any one of Examples 74-95, and optionally, comprising one or more antennas.

Example 97 includes a method to be performed at a Bluetooth (BT) apparatus, the method comprising receiving, at a BT Lower MAC (L-MAC), setup information from a BT Upper MAC (U-MAC) via an interface between the BT L-MAC and the BT U-MAC, the setup information to setup one or more BT activities, the one or more BT activities comprising at least a BT scan, the setup information to configure one or more wakeup criteria for the BT L-MAC to wake up the BT U-MAC; performing the one or more BT activities based on the setup information from the BT U-MAC; and sending a wakeup indication to the BT U-MAC based on the wakeup criteria.

Example 98 includes the subject matter of Example 97, and optionally, wherein the setup information comprises message processing setup information to configure processing of one or more wireless BT messages received by the BT radio.

Example 99 includes the subject matter of Example 98, and optionally, comprising processing, at the BT L-MAC, a BT message received by the BT radio based on the message processing setup information and autonomously from the BT U-MAC.

Example 100 includes the subject matter of Example 98 or 99, and optionally, comprising processing, at the BT L-MAC, a BT message received by the BT radio based on the message processing setup information and without waking up the BT U-MAC.

Example 101 includes the subject matter of any one of Examples 98-100, and optionally, wherein the message processing setup information is to define one or more criteria for the BT L-MAC to cause the BT radio to transmit a response to a BT message received by the BT radio.

Example 102 includes the subject matter of any one of Examples 98-101, and optionally, wherein the message processing setup information is to define one or more criteria for the BT L-MAC to cause the BT radio to transmit a response to a BT advertisement or a BT scan request.

Example 103 includes the subject matter of any one of Examples 98-102, and optionally, wherein the message processing setup information comprises one or more filtering parameters for the BT scan, the method comprising sending from the BT L-MAC to the BT U-MAC scan results based on the filtering parameters.

Example 104 includes the subject matter of any one of Examples 97-103, and optionally, wherein the one or more wakeup criteria comprise a time-based wakeup criterion to define a time at which the BT L-MAC is to send the wakeup indication to the BT U-MAC.

Example 105 includes the subject matter of any one of Examples 97-104, and optionally, wherein the setup information is to define one or more BT message parameters, the method comprising sending from the BT L-MAC the wakeup indication to the BT U-MAC based on receipt at the BT radio of one or more BT messages corresponding to the one or more BT message parameters.

Example 106 includes the subject matter of Example 105, and optionally, wherein the one or more BT message parameters comprise at least one of a BT message type parameter or a BT message content parameter.

Example 107 includes the subject matter of any one of Examples 97-106, and optionally, comprising sending, from the BT L-MAC, the wakeup indication to the BT U-MAC based on an outcome of at least one of the BT activities.

Example 108 includes the subject matter of any one of Examples 97-107, and optionally, comprising configuring the BT L-MAC to cause the interface to send the wakeup indication to the BT U-MAC based on a result of the BT scan.

Example 109 includes the subject matter of any one of Examples 97-108, and optionally, comprising configuring the BT L-MAC to control operation of the BT radio according to the BT activities.

Example 110 includes the subject matter of any one of Examples 97-109, and optionally, comprising configuring the BT L-MAC to perform the BT activities autonomously from the BT U-MAC.

Example 111 includes the subject matter of any one of Examples 97-110, and optionally, wherein the one or more BT activities comprise at least one of a device discovery activity, an advertisement activity, or an idle connection activity.

Example 112 includes the subject matter of any one of Examples 97-111, and optionally, wherein the one or more BT activities comprise at least one of a BT Low Energy (LE) Scan activity, an LE advertising activity, communication of an LE scan request, or communication of an LE scan response.

Example 113 includes the subject matter of any one of Examples 97-112, and optionally, wherein the one or more BT activities comprise at least one of a BT paging activity, a BT inquiry activity, or a BT synchronization activity.

Example 114 includes the subject matter of any one of Examples 97-113, and optionally, wherein the one or more BT activities comprise one or more background activities.

Example 115 includes the subject matter of any one of Examples 97-114, and optionally, wherein the one or more BT activities comprise one or more real-time activities.

Example 116 includes a product comprising one or more tangible computer-readable non-transitory storage media comprising computer-executable instructions operable to, when executed by at least one processor, enable the at least one processor to cause a Bluetooth (BT) apparatus to receive, at a BT Lower MAC (L-MAC), setup information from a BT Upper MAC (U-MAC) via an interface between the BT L-MAC and the BT U-MAC, the setup information to setup one or more BT activities, the one or more BT activities comprising at least a BT scan, the setup information to configure one or more wakeup criteria for the BT L-MAC to wake up the BT U-MAC; perform the one or more BT activities based on the setup information from the BT U-MAC; and send a wakeup indication to the BT U-MAC based on the wakeup criteria.

Example 117 includes the subject matter of Example 116, and optionally, wherein the setup information comprises message processing setup information to configure processing of one or more wireless BT messages received by the BT radio.

Example 118 includes the subject matter of Example 117, and optionally, wherein the instructions, when executed, cause the BT L-MAC to process a BT message received by the BT radio based on the message processing setup information and autonomously from the BT U-MAC.

Example 119 includes the subject matter of Example 117 or 118, and optionally, wherein the instructions, when executed, cause the BT L-MAC to process a BT message received by the BT radio based on the message processing setup information and without waking up the BT U-MAC.

Example 120 includes the subject matter of any one of Examples 117-119, and optionally, wherein the message processing setup information is to define one or more criteria for the BT L-MAC to cause the BT radio to transmit a response to a BT message received by the BT radio.

Example 121 includes the subject matter of any one of Examples 117-120, and optionally, wherein the message processing setup information is to define one or more criteria for the BT L-MAC to cause the BT radio to transmit a response to a BT advertisement or a BT scan request.

Example 122 includes the subject matter of any one of Examples 117-121, and optionally, wherein the message processing setup information comprises one or more filtering parameters for the BT scan, the instructions, when executed, cause the BT L-MAC to send to the BT U-MAC scan results based on the filtering parameters.

Example 123 includes the subject matter of any one of Examples 116-122, and optionally, wherein the one or more wakeup criteria comprise a time-based wakeup criterion to define a time at which the BT L-MAC is to send the wakeup indication to the BT U-MAC.

Example 124 includes the subject matter of any one of Examples 116-123, and optionally, wherein the setup information is to define one or more BT message parameters, the instructions, when executed, cause the BT L-MAC to send the wakeup indication to the BT U-MAC based on receipt at the BT radio of one or more BT messages corresponding to the one or more BT message parameters.

Example 125 includes the subject matter of Example 124, and optionally, wherein the one or more BT message parameters comprise at least one of a BT message type parameter or a BT message content parameter.

Example 126 includes the subject matter of any one of Examples 116-125, and optionally, wherein the instructions, when executed, cause the BT L-MAC to send the wakeup indication to the BT U-MAC based on an outcome of at least one of the BT activities.

Example 127 includes the subject matter of any one of Examples 116-126, and optionally, wherein the instructions, when executed, cause the BT apparatus to configure the BT L-MAC to cause the interface to send the wakeup indication to the BT U-MAC based on a result of the BT scan.

Example 128 includes the subject matter of any one of Examples 116-127, and optionally, wherein the instructions, when executed, cause the BT apparatus to configure the BT L-MAC to control operation of the BT radio according to the BT activities.

Example 129 includes the subject matter of any one of Examples 116-128, and optionally, wherein the instructions, when executed, cause the BT apparatus to configure the BT L-MAC to perform the BT activities autonomously from the BT U-MAC.

Example 130 includes the subject matter of any one of Examples 116-129, and optionally, wherein the one or more BT activities comprise at least one of a device discovery activity, an advertisement activity, or an idle connection activity.

Example 131 includes the subject matter of any one of Examples 116-130, and optionally, wherein the one or more BT activities comprise at least one of a BT Low Energy (LE) Scan activity, an LE advertising activity, communication of an LE scan request, or communication of an LE scan response.

Example 132 includes the subject matter of any one of Examples 116-131, and optionally, wherein the one or more BT activities comprise at least one of a BT paging activity, a BT inquiry activity, or a BT synchronization activity.

Example 133 includes the subject matter of any one of Examples 116-132, and optionally, wherein the one or more BT activities comprise one or more background activities.

Example 134 includes the subject matter of any one of Examples 116-133, and optionally, wherein the one or more BT activities comprise one or more real-time activities.

Example 135 includes a Bluetooth (BT) apparatus comprising means for receiving, at a BT Lower MAC (L-MAC), setup information from a BT Upper MAC (U-MAC) via an interface between the BT L-MAC and the BT U-MAC, the setup information to setup one or more BT activities, the one or more BT activities comprising at least a BT scan, the setup information to configure one or more wakeup criteria for the BT L-MAC to wake up the BT U-MAC; means for performing the one or more BT activities based on the setup information from the BT U-MAC; and means for sending a wakeup indication to the BT U-MAC based on the wakeup criteria.

Example 136 includes the subject matter of Example 135, and optionally, wherein the setup information comprises message processing setup information to configure processing of one or more wireless BT messages received by the BT radio.

Example 137 includes the subject matter of Example 136, and optionally, comprising means for processing, at the BT L-MAC, a BT message received by the BT radio based on the message processing setup information and autonomously from the BT U-MAC.

Example 138 includes the subject matter of Example 136 or 137, and optionally, comprising means for processing, at the BT L-MAC, a BT message received by the BT radio based on the message processing setup information and without waking up the BT U-MAC.

Example 139 includes the subject matter of any one of Examples 136-138, and optionally, wherein the message processing setup information is to define one or more criteria for the BT L-MAC to cause the BT radio to transmit a response to a BT message received by the BT radio.

Example 140 includes the subject matter of any one of Examples 136-139, and optionally, wherein the message processing setup information is to define one or more criteria for the BT L-MAC to cause the BT radio to transmit a response to a BT advertisement or a BT scan request.

Example 141 includes the subject matter of any one of Examples 136-140, and optionally, wherein the message processing setup information comprises one or more filtering parameters for the BT scan, the apparatus comprising means for sending from the BT L-MAC to the BT U-MAC scan results based on the filtering parameters.

Example 142 includes the subject matter of any one of Examples 135-141, and optionally, wherein the one or more wakeup criteria comprise a time-based wakeup criterion to define a time at which the BT L-MAC is to send the wakeup indication to the BT U-MAC.

Example 143 includes the subject matter of any one of Examples 135-142, and optionally, wherein the setup information is to define one or more BT message parameters, the apparatus comprising means for sending from the BT L-MAC the wakeup indication to the BT U-MAC based on receipt at the BT radio of one or more BT messages corresponding to the one or more BT message parameters.

Example 144 includes the subject matter of Example 143, and optionally, wherein the one or more BT message parameters comprise at least one of a BT message type parameter or a BT message content parameter.

Example 145 includes the subject matter of any one of Examples 135-144, and optionally, comprising means for sending, from the BT L-MAC, the wakeup indication to the BT U-MAC based on an outcome of at least one of the BT activities.

Example 146 includes the subject matter of any one of Examples 135-145, and optionally, comprising means for configuring the BT L-MAC to cause the interface to send the wakeup indication to the BT U-MAC based on a result of the BT scan.

Example 147 includes the subject matter of any one of Examples 135-146, and optionally, comprising means for configuring the BT L-MAC to control operation of the BT radio according to the BT activities.

Example 148 includes the subject matter of any one of Examples 135-147, and optionally, comprising means for configuring the BT L-MAC to perform the BT activities autonomously from the BT U-MAC.

Example 149 includes the subject matter of any one of Examples 135-148, and optionally, wherein the one or more BT activities comprise at least one of a device discovery activity, an advertisement activity, or an idle connection activity.

Example 150 includes the subject matter of any one of Examples 135-149, and optionally, wherein the one or more BT activities comprise at least one of a BT Low Energy (LE) Scan activity, an LE advertising activity, communication of an LE scan request, or communication of an LE scan response.

Example 151 includes the subject matter of any one of Examples 135-150, and optionally, wherein the one or more BT activities comprise at least one of a BT paging activity, a BT inquiry activity, or a BT synchronization activity.

Example 152 includes the subject matter of any one of Examples 135-151, and optionally, wherein the one or more BT activities comprise one or more background activities.

Example 153 includes the subject matter of any one of Examples 135-152, and optionally, wherein the one or more BT activities comprise one or more real-time activities.

Example 154 includes a wireless communication device comprising a processor; a memory; one or more antennas; an interface to interface between a Bluetooth (BT) Upper Medium Access Control (MAC) (U-MAC) and a BT Lower MAC (L-MAC); a System on Chip (SoC) comprising the BT U-MAC, the BT U-MAC configured to generate setup information to configure one or more BT activities by the BT L-MAC, and to send the setup information to the BT L-MAC via the interface, the setup information to configure one or more wakeup criteria for the BT L-MAC to wake up the BT U-MAC, the one or more BT activities comprising at least a BT scan, wherein the BT U-MAC is configured to enter a power save mode and to wake up from the power save mode based on receipt of a wakeup indication from the BT L-MAC via the interface to the BT L-MAC; and a radio chip comprising a BT radio to communicate BT signals; and the BT L-MAC comprising logic and circuitry to perform the one or more BT activities based on the setup information from the BT U-MAC, and to send the wakeup indication to the BT U-MAC based on the wakeup criteria.

Example 155 includes the subject matter of Example 154, and optionally, wherein the setup information comprises message processing setup information to configure processing of one or more wireless BT messages received by the BT radio.

Example 156 includes the subject matter of Example 155, and optionally, wherein the BT L-MAC is to process a BT message received by the BT radio based on the message processing setup information and autonomously from the BT U-MAC.

Example 157 includes the subject matter of Example 155 or 156, and optionally, wherein the BT L-MAC is to process a BT message received by the BT radio based on the message processing setup information and without waking up the BT U-MAC.

Example 158 includes the subject matter of any one of Examples 155-157, and optionally, wherein the message processing setup information is to define one or more criteria for the BT L-MAC to cause the BT radio to transmit a response to a BT message received by the BT radio.

Example 159 includes the subject matter of any one of Examples 155-158, and optionally, wherein the message processing setup information is to define one or more criteria for the BT L-MAC to cause the BT radio to transmit a response to a BT advertisement or a BT scan request.

Example 160 includes the subject matter of any one of Examples 155-159, and optionally, wherein the message processing setup information comprises one or more filtering parameters for the BT scan, the BT L-MAC to send to the BT U-MAC scan results based on the filtering parameters.

Example 161 includes the subject matter of any one of Examples 154-160, and optionally, wherein the one or more wakeup criteria comprise a time-based wakeup criterion to define a time at which the BT L-MAC is to send the wakeup indication to the BT U-MAC.

Example 162 includes the subject matter of any one of Examples 154-161, and optionally, wherein the setup information is to define one or more BT message parameters, the BT L-MAC configured to send the wakeup indication to the BT U-MAC based on receipt at the BT radio of one or more BT messages corresponding to the one or more BT message parameters.

Example 163 includes the subject matter of Example 162, and optionally, wherein the one or more BT message parameters comprise at least one of a BT message type parameter or a BT message content parameter.

Example 164 includes the subject matter of any one of Examples 154-163, and optionally, wherein the BT L-MAC is configured to send the wakeup indication to the BT U-MAC based on an outcome of at least one of the BT activities.

Example 165 includes the subject matter of any one of Examples 154-164, and optionally, wherein the BT L-MAC is configured to cause the interface to send the wakeup indication to the BT U-MAC based on a result of the BT scan.

Example 166 includes the subject matter of any one of Examples 154-165, and optionally, wherein the BT L-MAC is configured to control operation of the BT radio according to the BT activities.

Example 167 includes the subject matter of any one of Examples 154-166, and optionally, wherein the BT L-MAC is configured to perform the BT activities autonomously from the BT U-MAC.

Example 168 includes the subject matter of any one of Examples 154-167, and optionally, wherein the one or more BT activities comprise at least one of a device discovery activity, an advertisement activity, or an idle connection activity.

Example 169 includes the subject matter of any one of Examples 154-168, and optionally, wherein the one or more BT activities comprise at least one of a BT Low Energy (LE) Scan activity, an LE advertising activity, communication of an LE scan request, or communication of an LE scan response.

Example 170 includes the subject matter of any one of Examples 154-169, and optionally, wherein the one or more BT activities comprise at least one of a BT paging activity, a BT inquiry activity, or a BT synchronization activity.

Example 171 includes the subject matter of any one of Examples 154-170, and optionally, wherein the one or more BT activities comprise one or more background activities.

Example 172 includes the subject matter of any one of Examples 154-171, and optionally, wherein the one or more BT activities comprise one or more real-time activities, the BT U-MAC configured to perform one or more non-real-time BT activities.

Example 173 includes the subject matter of any one of Examples 154-172, and optionally, comprising a BT Host Controller Interface (HCI) to interface between the BT U-MAC and a BT host processor.

Example 174 includes the subject matter of any one of Examples 154-173, and optionally, wherein the interface comprises a high-speed serial interface.

Example 175 includes the subject matter of any one of Examples 154-174, and optionally, wherein the SoC comprises a host SoC, the host SoC comprising a BT host processor, and a host memory.

Example 176 includes the subject matter of any one of Examples 154-175, and optionally, wherein the BT radio comprises a BT digital baseband (BB) and BT Radio Frequency (RF) circuitry.

Example 177 includes the subject matter of any one of Examples 154-176, and optionally, wherein the BT U-MAC is configured to be at the power save mode during at least part of a scan period of the BT scan.

Example 178 includes the subject matter of any one of Examples 154-177, and optionally, wherein the BT U-MAC is configured to be at the power save mode during at least part of one or more BT activity periods of the one or more BT activities.

Example 179 includes the subject matter of any one of Examples 154-178, and optionally, wherein the BT U-MAC is configured to process one or more BT user data handling activities.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A Bluetooth (BT) apparatus comprising a System on Chip (SoC), the SoC comprising:
    an interface to a BT Lower Medium Access Control (MAC) (L-MAC) external to the SoC; and
    a BT Upper MAC (U-MAC) to generate setup information to configure one or more BT activities by the BT L-MAC, and to send the setup information to the BT L-MAC via the interface, the setup information to configure one or more wakeup criteria for the BT L-MAC to wake up the BT U-MAC, the one or more BT activities comprising at least a BT scan, wherein the BT U-MAC is configured to enter a power save mode and to wake up from the power save mode based on receipt of a wakeup indication from the BT L-MAC via the interface to the BT L-MAC.

2. The BT apparatus of claim 1, wherein the setup information comprises message processing setup information to configure processing of one or more BT messages received by the BT L-MAC.

3. The BT apparatus of claim 2, wherein the message processing setup information is to define one or more criteria for the BT L-MAC to transmit a response to a wireless BT message received by the BT L-MAC.

4. The BT apparatus of claim 2, wherein the message processing setup information comprises one or more filtering parameters for the BT scan, the BT U-MAC to receive from the BT L-MAC scan results based on the filtering parameters.

5. The BT apparatus of claim 1, wherein the one or more wakeup criteria comprise a time-based wakeup criterion to define a time at which the BT L-MAC is to send the wakeup indication to the BT U-MAC.

6. The BT apparatus of claim 1, wherein the setup information is to define one or more BT message parameters, and the one or more wakeup criteria comprise a communication-based wakeup criterion to define that the BT L-MAC is to send the wakeup indication to the BT U-MAC based on receipt of one or more BT messages corresponding to the one or more BT message parameters.

7. The BT apparatus of claim 1, wherein the one or more wakeup criteria comprise an activity-based wakeup criterion to define that the BT L-MAC is to send the wakeup indication to the BT U-MAC based on an outcome of at least one of the BT activities.

8. The BT apparatus of claim 1, wherein the BT U-MAC is configured to be at the power save mode during at least part of a scan period of the BT scan.

9. The BT apparatus of claim 1, wherein the BT U-MAC is configured to be at the power save mode during at least part of one or more BT activity periods of the one or more BT activities.

10. The BT apparatus of claim 1, wherein the one or more BT activities comprise at least one of a device discovery activity, an advertisement activity, or an idle connection activity.

11. The BT apparatus of claim 1, wherein the one or more BT activities comprise one or more background activities.

12. The BT apparatus of claim 1, wherein the one or more BT activities comprise one or more real-time activities, the BT U-MAC configured to perform one or more non-real-time BT activities.

13. The BT apparatus of claim 1 comprising a BT Host Controller Interface (HCI) to interface between the BT U-MAC and a BT host processor.

14. The BT apparatus of claim 1, wherein the SoC comprises a host SoC, the host SoC comprising a BT host processor, and a host memory.

15. The BT apparatus of claim 1 comprising a radio chip, the radio chip comprising a BT radio and the BT L-MAC to perform the one or more BT activities based on the setup information from the BT U-MAC.

16. A Bluetooth (BT) apparatus comprising a radio chip, the radio chip comprising:
    a BT radio to communicate BT signals;
    an interface to a BT Upper Medium Access Control (MAC) (U-MAC) separate from the radio chip, the interface configured to receive from the BT U-MAC setup information to setup one or more BT activities, the one or more BT activities comprising at least a BT scan; and
    a BT Lower MAC (L-MAC) comprising logic and circuitry to perform the one or more BT activities based on the setup information from the BT U-MAC, wherein the setup information is to configure one or more wakeup criteria for the BT L-MAC to wake up the BT U-MAC, the BT L-MAC configured to cause the interface to send a wakeup indication to the BT U-MAC based on the wakeup criteria.

17. The BT apparatus of claim 16, wherein the setup information comprises message processing setup information to configure processing of one or more wireless BT messages received by the BT radio.

18. The BT apparatus of claim 16, wherein the setup information is to define one or more BT message parameters, the BT L-MAC configured to send the wakeup indication to the BT U-MAC based on receipt at the BT radio of one or more BT messages corresponding to the one or more BT message parameters.

19. The BT apparatus of claim 16, wherein the BT L-MAC is configured to send the wakeup indication to the BT U-MAC based on an outcome of at least one of the BT activities.

20. The BT apparatus of claim 16, wherein the BT L-MAC is configured to cause the interface to send the wakeup indication to the BT U-MAC based on a result of the BT scan.

21. The BT apparatus of claim 16, wherein the BT L-MAC is configured to perform the BT activities autonomously from the BT U-MAC.

22. The BT apparatus of claim 16, wherein the BT radio comprises a BT digital baseband (BB) and BT Radio Frequency (RF) circuitry.

23. A wireless communication device comprising:
a processor;
a memory;
one or more antennas;
an interface to interface between a Bluetooth (BT) Upper Medium Access Control (MAC) (U-MAC) and a BT Lower MAC (L-MAC);
a System on Chip (SoC) comprising the BT U-MAC, the BT U-MAC configured to generate setup information to configure one or more BT activities by the BT L-MAC, and to send the setup information to the BT L-MAC via the interface, the setup information to configure one or more wakeup criteria for the BT L-MAC to wake up the BT U-MAC, the one or more BT activities comprising at least a BT scan, wherein the BT U-MAC is configured to enter a power save mode and to wake up from the power save mode based on receipt of a wakeup indication from the BT L-MAC via the interface to the BT L-MAC; and
a radio chip comprising:
a BT radio to communicate BT signals; and
the BT L-MAC comprising logic and circuitry to perform the one or more BT activities based on the setup information from the BT U-MAC, and to send the wakeup indication to the BT U-MAC based on the wakeup criteria.

24. The wireless communication device of claim 23, wherein the setup information comprises message processing setup information to configure processing of one or more wireless BT messages received by the BT radio.

25. The wireless communication device of claim 23, wherein the BT L-MAC is configured to perform the BT activities autonomously from the BT U-MAC.

* * * * *